United States Patent
Xiang

(10) Patent No.: US 12,055,925 B2
(45) Date of Patent: Aug. 6, 2024

(54) MEASURING INSTRUMENT AND METHOD OF REMOTE QUANTITY VALUE TRANSFER/TRACEABILITY THEREOF

(71) Applicants: Yougang Xiang, Foshan (CN); Liping Tang, Guangzhou (CN)

(72) Inventor: Yougang Xiang, Guangzhou (CN)

(73) Assignees: Yougang Xiang, Foshan (CN); Liping Tang, Guangzhou (CN)

( * ) Notice: Subject to any disclaimer, the term of this patent is extended or adjusted under 35 U.S.C. 154(b) by 377 days.

(21) Appl. No.: 17/523,996

(22) Filed: Nov. 11, 2021

(65) Prior Publication Data

US 2022/0066433 A1  Mar. 3, 2022

Related U.S. Application Data

(63) Continuation of application No. PCT/CN2020/090509, filed on May 15, 2020.

(30) Foreign Application Priority Data

May 17, 2019 (CN) .......................... 201910414868.9
Sep. 27, 2019 (CN) .......................... 201910927643.3
Sep. 27, 2019 (CN) .......................... 201910927662.6

(51) Int. Cl.
*G01B 3/18* (2006.01)
*G05B 23/02* (2006.01)
*G06Q 30/018* (2023.01)

(52) U.S. Cl.
CPC ........... *G05B 23/0221* (2013.01); *G01B 3/18* (2013.01); *G06Q 30/018* (2013.01)

(58) Field of Classification Search
CPC ..... G01B 3/18; G06Q 30/018; G05B 23/0221
See application file for complete search history.

(56) References Cited

FOREIGN PATENT DOCUMENTS

| CN | 102435392 A | * | 5/2012 |
|----|-------------|---|--------|
| CN | 102435392 A |   | 5/2012 |
| CN | 202720088 U | * | 2/2013 |
| CN | 202720088 U |   | 2/2013 |
| CN | 109725281 A |   | 5/2019 |

* cited by examiner

*Primary Examiner* — Jamel E Williams
(74) *Attorney, Agent, or Firm* — WPAT, PC

(57) ABSTRACT

A measuring instrument and a method of remote quantity value transfer/traceability are provided. The measuring instrument includes a central processing component, a local quantity value transfer/traceability component connected to the central processing component, a remote quantity value transfer/traceability component connected to the central processing component and a remote communication component connected to the central processing component; a metrological grade of the remote quantity value transfer/traceability component is greater than or equal to that of the local quantity value transfer/traceability component; the remote quantity value transfer/traceability component is configured to perform quantity value transfer/traceability to the local quantity value transfer/traceability component by using one of the in-machine metrological standard and the remote high-grade metrological standard provided from the remote quantity value transfer/traceability component. The method of remote quantity value transfer/traceability can be achieved to make the quantity value transfer/traceability of the measuring instrument very convenient, simple and less costly.

19 Claims, 13 Drawing Sheets

MEASURING INSTRUMENT AND METHOD OF REMOTE QUANTITY VALUE TRANSFER/TRACEABILITY THEREOF

CROSS-REFERENCE TO RELATED APPLICATIONS

This application claims the benefit of priority to Chinese Patent Application No. 201910414868.9, filed with the China National Intellectual Property Office on May 17, 2019, and claims the benefits of priorities to Chinese Patent Application Nos. 201910927662.6 and 201910927643.3 both filed with the China National Intellectual Property Office on Sep. 27, 2019, the entire disclosures of which are incorporated herein by reference.

TECHNICAL FIELD

The disclosure relates to the field of metrological technology, and more particularly to a measuring instrument and a method of remote quantity value transfer/traceability of the measuring instrument.

BACKGROUND

In this patent application, some terms are defined as follows:

Quantity value transfer: refers to a kind of activity of transferring unit quantity values, reproduced by metrological bases or metrological standards through verification or calibration performed on measuring instruments, to work measuring instruments through measurement standards of various grades, so as to ensure accuracy and consistency of measured quantity values.

Quantity value traceability: refers to a characteristic of enabling a measurement result or a value of measurement standard to be linked to a specified reference standard (generally a national measurement standard or an international measurement standard) through an uninterrupted comparison chain with specified uncertainty.

The quantity value transfer and the quantity value traceability are mutually inverse processes. In particular, the quantity value transfer refers to the process of transferring the quantity value reproduced by a national measurement base instrument from top to bottom to measurement standard instruments at various grades in a grade-by-grade manner until work measuring apparatuses. The quantity value traceability refers to the process of tracing measured values of work measuring apparatuses or measurement standard instruments from bottom to top to superior measurement standard instruments until a national standard measuring instrument, and it can be carried out bypassing an intermediate grade.

Verification: refers to a kind of activity of finding out and confirming whether a measuring instrument meets statutory requirements, and includes inspection, marking and/or issuance of verification certificate. Only the measuring instrument that meet the requirements will be issued with a verification certificate and/or marked, which means that the measuring instrument is endowed with a legal characteristic, while the measuring instrument that does not meet the requirements can only be issued with a verification result notification. The verification is an important means of the quantity value transfer and includes first verification, follow-up verification and so on.

First verification: refers to a series of operations including inspection, marking and/or issuance of verification certificate performed on a measuring instrument as per requirements of verification regulations after it is produced and before it is used. A purpose the first verification is to determine whether measuring performance of a newly produced or purchased measuring instrument meets requirements specified at the time of such type being approved.

Follow-up verification: refers to any kind of verification after the first verification of a measuring instrument, such as compulsory periodic verification (referred to as "compulsory verification"), periodic verification within its validity period, and post-repair verification. Regardless of whether it is a verification requested by a user or a verification caused by a seal within a validity period being invalid for some reason, such verification is called as follow-up verification.

Examination: refers to check up for finding out whether a verification mark or a verification certificate of a measuring instrument is valid, whether a protection mark is damaged, whether the measuring instrument has been significantly changed after verification, and whether an error of measurement instrument exceeds a maximum allowable error in use. Its main purpose is to find out whether the measuring instrument is out of tolerance.

Compulsory verification: for public measurement standard instruments, highest measurement standard instruments used by departments and enterprises, and work measuring apparatuses for four aspects of trade settlement, safety protection, medical and health, environmental monitoring listed in a national compulsory verification catalog, legal metrology verification institutions or authorized metrology technical institutions designated by metrological administrative departments of the people's governments at or above the county level shall carry out fixed-point and regular verifications. "Fixed-point" refers to the implementation of "territorial management", that is, measuring instruments of enterprises belonging to a certain area in an administrative division must be sent to a government's statutory metrological verification institution or authorized metrological technical institution in the area for verification. "Regular" refers to that a verification period (or "effective verification time interval") of a measuring instrument must be equal to or less than a verification period (or "effective verification time interval") specified in metrological verification regulations issued by the state.

First compulsory verification: work measuring apparatuses such as electric energy meters, water meters, gas meters, and heat meters installed and used in residential construction, are referred to as "civil four meters", which must be subject to the first compulsory verification before installation and use, but due to their large quantity, wide application area and inconvenient assembly and disassembly, after the first compulsory inspection, no follow-up verification will be carried out, but a certain service life for the measuring apparatus will be specified and then scrapped at the expiration, and a corresponding installation position will be replaced with a new measuring apparatus of the same type. Such situation is referred to as "first compulsory verification, replacement upon expiration".

Non-mandatory verification: refers to a kind of verification conducted according to law by the use enterprise of a measuring instrument itself or by an entrusted metrological verification institution with public metrological standards or authorization. A verification period and a verification method of the non-compulsory verification measuring instrument are managed by the enterprise itself according to law, and the verification period or the verification institution is independently determined by the enterprise according to the actual use of the measuring instrument, based on principles of science, economy and quantity value accuracy.

Calibration: it is a main means of the quantity value traceability and refers to a set of operations under specified conditions: first determining a relationship between a quantity value provided by a measurement standard and a corresponding indication value, and then using the information to determine a relationship associated with a measurement result obtained from the indication value. Herein, the quantity value provided by the measurement standard and the corresponding indication value have measurement uncertainty.

Comparison: it has the meaning of comparing or checking, and refers to a process of comparing quantity values reproduced by a same type of measuring instruments with the same accuracy grade or uncertainty range under specified conditions. If the quantity values or technical parameters of samples used for comparison are not known to participants in advance, this type of comparison is called as blind sample comparison. The comparison of measuring instruments usually includes method comparisons, personnel comparisons, equipment comparisons and environmental conditions comparisons between laboratories or enterprises with the same type of measuring instruments, and also includes method comparisons, personnel comparisons, equipment comparisons, and environmental conditions comparisons inside a laboratory or an enterprise with the same type of measuring instruments.

Test: refers to the meaning of measurement or experiment, which is a measurement with an experimental nature, and a combination of measurement and experiment. Since test and measurement are closely related, and thus in actual use, it is often not strictly distinguished between test and measurement. A basic task of the test is to use a special measuring instrument and a reasonably designed experimental method, and carry out necessary signal analysis and data processing, so as to obtain relevant information such as performance and accuracy of the tested object. The test can be carried out according to corresponding clauses in national metrological verification regulations or calibration specifications, or can be carried out according to performance and accuracy requirements of the tested object using technical basis approved by both the entrusting party and the entrusted party.

Intermediate Checks (also referred to as Run check): refer to the verification carried out between two verifications/calibrations in order to maintain credibility of verification/calibration status of measuring instruments, and include the intermediate check of a measuring instrument in use and the intermediate check of a reference standard instrument, the two together are essentially equivalent to the run check in ISO/IEC Guide 25. Such checks shall be carried out in accordance with specified procedures. The intermediate checks can enhance confidence of the laboratory and ensure accuracy and reliability of test data.

Measuring instruments: as main tools for performing verifications or calibrations, and generally refer to metrological devices (such as taxi meter verification devices, high-frequency microwave power meter calibration devices, etc.), instruments (such as heart/EEG machines, pressure gauges, flow meters, etc.), sensors (such as sensors equipped by various metrological devices or instruments, various independent input/output sensors, measuring sensors or measuring probes in negative feedback closed-loop control loops in various equipment, etc.), measuring tools (such as gauge blocks, weights, etc.), and standard substances for unifying quantity values (such as carbon monoxide gas standard substances, ultraviolet light zone transmittance standard filters, etc.) and so on, which can directly or indirectly measure quantity values of measured objects alone or together with auxiliary equipment. According to provisions of the national "Metrology Law" and relevant regulations on measuring instruments, measuring instruments must be performed with "verification" or "calibration" by qualified metrological technical institutions in accordance with corresponding metrological verification regulations or calibration specifications before being used or within their effective verification periods or calibration intervals. Meanwhile, within the effective verification period of the measuring instrument, a use department of the measuring instrument can conduct an in-use examination on the measuring instrument in accordance with provisions of corresponding metrological verification regulations or calibration specifications.

As per a classification of metrological purposes, measuring instruments mainly include three types of measuring instruments: measurement base instrument, measurement standard instrument, and work measuring instrument.

1) Measurement base instrument: refers to a measuring instrument with a current highest accuracy grade in a certain field, which is not only a starting point of the quantity value transfer, but also an end point of the quantity value traceability. Recognized by international agreements, standards that are used as the basis for value setting of all other standards of given quantities in the world are called as international bases. After officially confirmed by the state/country, standards that are used as the basis for value setting of all other standards of given quantities in the state are called as national bases. National measurement base instruments include three categories: national primary measurement base instrument, national secondary measurement base instrument, and national work measurement base instrument. The national primary measurement base instrument is the starting point of quantity value transfer of a country as well as the end point of quantity value traceability of the country, which has a highest metrological characteristic in the country. The national secondary measurement base instrument is used to substitute daily use of the national primary measurement base instrument and verify a change of the national primary measurement base instrument, and once the national primary measurement base instrument is damaged, the national secondary measurement base instrument can be used to replace the national primary measurement base instrument. The national work measurement base instrument is mainly used to substitute the daily use of the national secondary measurement base instrument, and verify/calibrate a metrological standard, so as to avoid the national secondary measurement base instrument to lose its due metrological characteristics or be damaged resulting from frequent use.

2) Work measuring instrument (also referred to as ordinary measuring instrument): refers to a measuring instrument (including various sensors used in a production site) used in general daily work or a product (commodity) production line, whose accuracy grade is the lowest, and it is not only an end point of quantity value transfer, but also a starting point of quantity value traceability. This application classifies measuring sensors in equipment with negative feedback automatic control functions into the category of work measuring instruments.

3) Measurement standard instrument: refers to a measuring instrument having an accuracy grade between accuracy grades of the measurement base instrument and the work measuring apparatus and being located in the middle of quantity value transfer or quantity value traceability, which not only receives a quantity value transferred from the measurement base instrument and then transfers downwardly to the work measuring apparatus, but also receives a quantity value traced from the work measuring apparatus and then traces to the measurement base instrument.

Measuring instruments are divided into two categories according to their output or input methods: standard source category and standard meter category. Technical parameters for quantity value transfer and quantity value traceability also have two manifestations: either as an output quantity of the standard source, or as an input quantity measured by the standard instrument.

1) Metrological device or instrument: belongs to either the standard source category to output the technical parameter involved in quantity value transfer or quantity value traceability to a calibrated instrument to verify/calibrate an indication error of the calibrated instrument, or the standard meter category to verify/calibrate the indication error of a measured source input to its input port. For example, the American FLUKE 5500A multi-function calibrator is a source, while the Danish B&K 3560 PULSE multi-analyzer system is an instrument as well as a source.

2) Measurement apparatus: generally, belongs to the meter category, such as a pressure gauge, a thermometer, etc.

3) Sensor or transducer: input terminals of sensors are generally classified into the meter category, such as input terminals of sensors equipped by various metrological devices or instruments, input terminals of various independent sensors, etc. Output terminals of sensors are generally classified into the source category, such as output terminals of sensors equipped by various metrological devices or instruments, output terminals of various independent sensors, etc.

4) Measuring tool: can belong to either the source category, or the meter category. For example, a gauge block is a source, and a caliper is an instrument.

5) Standard substances: generally belong to the source category, such as a standard pH solution, etc.

At present, there are mainly four methods of "quantity value transfer" or "quantity value traceability" as follows.

[First method]: using physical standards for grade-by-grade quantity value transfer or quantity value traceability It is a traditional method of quantity value transfer or quantity value traceability, and also is a method of quantity value transfer or quantity value traceability commonly used in metrological fields of length, temperature, mechanics, electricity and so on in China. It is implemented by metrological verification/calibration institutions or metrological technical institutions authorized by relevant departments or enterprises (hereinafter referred to as "superior metrological verification/calibration institutions"). In the case of "verification", "verification certificate" or "result notification" is issued; and in the case of "calibration", "calibration certificate" is issued and "evaluation of uncertainty of measurement result" is given. Basic steps associated therewith are as follows:

1) An enterprise to-be-inspected that requires quantity value transfer/traceability will manually transport a measuring instrument to-be-inspected (usually is "measurement standard instrument" or "work measuring apparatus") and regularly send to a superior metrological verification/calibration institution for verification/calibration. As to a measuring instrument that is not easy to disassemble or carry, requesting a technician of the superior metrological verification/calibration institution to come to a site where the enterprise to-be-inspected that requires quantity value transfer/traceability is located to perform verification/calibration.

2) The technician of the superior metrological verification/calibration institution shall verify/calibrate the measuring instrument of the enterprise that requires quantity value transfer/traceability in accordance with a national metrological verification system meter, metrological verification regulations or calibration specifications. If it belongs to "verification" and the verification result is qualified, a verification certificate is issued, and if the verification result is unqualified, a verification result notification is issued. If it belongs to "calibration", a "calibration certificate" is issued and an "evaluation of uncertainty of measurement result" is given.

3) When the enterprise that requires quantity value transfer receives the verification certificate and has a metrological standard assessment certificate, it can carry out quantity value transfer or directly use the measuring instrument for measurement. When the enterprise that requires quantity value transfer receives the verification result notification, it can degrade the measuring instrument after the verification/calibration or discard the measuring instrument after the verification/calibration. When the enterprise that requires quantity value traceability receives the calibration certificate, it determines whether the calibrated measuring instrument meets its own needs for work based on the calibration result and measurement uncertainty evaluation data.

[Second method]: using certified reference materials (CRM) for quantity value transfer or quantity value traceability Reference materials (also referred to as standard substances) are substances or materials that have highly stable physical, chemical or metrological characteristics under specified conditions and are officially approved for use as standards. Their roles in the metrological field are mainly reflected in the following aspects:

1) As a "control substance", a quality thereof is analyzed simultaneously with that of a tested sample.

2) As a "standard substance", it is used to evaluate accuracy and reliability of new measurement method and instrument.

3) As a "known substance", it is used to evaluate accuracy and reliability of new measurement method and instrument.

Reference materials are generally divided into primary reference materials and secondary reference materials. The primary reference materials are mainly used to calibrate secondary reference materials or to verify/calibrate high-precision measuring instruments, and the secondary reference materials are mainly used to verify/calibrate general measuring instruments.

This method of quantity value transfer or quantity value traceability is that: the state authorizes some competent enterprises to produce standard substances for verification/calibration of certain measuring instruments. When an enterprise that requires quantity value transfer/traceability has corresponding measuring instruments that need verification/calibration, the enterprise requiring quantity value transfer/traceability sends its measurement instruments to-be-inspected to a superior measurement verification/calibration institution, or invites a technician from the superior measurement verification/calibration institution to its own site, for the purpose of selecting corresponding reference materials to verify/calibrate the measurement instruments to-be-inspected.

Enterprises or metrological verification/calibration technical institutions can purchase corresponding reference materials according to actual needs of quantity value transfer or quantity value traceability, and the reference materials are used as "metrological standards" to verify/calibrate certain measuring instruments or evaluate measurement methods, and only measuring instruments that have passed verification or calibration can be used. This method is currently mainly used in the field of physical and chemical measurements.

This method is not much different from the first method in operation, and both of them are operated manually, but this method uses the "reference materials" to replace the "measurement standard instruments" used in the first method.

[Third method]: using broadcast standard signals for quantity value transfer or quantity value traceability Standard signals are broadcast through radio stations for quantity value transfer or quantity value traceability. At present, in China, this method is mainly used in time-frequency or certain radio metrological fields. Users can directly receive standard signals on site and verify/calibrate corresponding time-frequency or certain radio measuring instruments. The state authorizes certain metrological technical institutions to broadcast standard time, frequency or standard (television) format signals. If a measuring instrument to-be-inspected of an enterprise requiring quantity value transfer/traceability is powered on or in a receiving state in advance, the measuring instrument to-be-inspected, after capturing and receiving a standard signal to-be-received, is "verified/calibrated" based on the received standard signal as per corresponding verification regulations or calibration specifications and then generates corresponding "verification/calibration" data. The enterprise requiring quantity value transfer/traceability sends the data back to a superior metrological verification/calibration institution, and the superior metrological verification/calibration institution analyzes and processes the data to obtain a verification error/calibration result, a system error and random error of measure, uncertainty of measurement result, etc., and issue a verification certificate (or result notification) or calibration certificate.

[Fourth method]: using "measurement assurance programs" (MAPS) for quantity value transfer or quantity value traceability The American National Bureau of Standards has developed a new solution of "measurement assurance programs (MAPS)" for quantity value transfer or quantity value traceability. Although a specific scheme varies with different parameters, it is roughly as follows: the National Bureau of Standards produces a batch of "transfer standards" with a certain degree of accuracy (for example, 10 power blocks), and sends two to each lower-grade laboratory every year, and specifies a measurement method at the same time. Each the lower-grade laboratory measures the received "transfer standards" with its own work standard, and then sends measurement results back to the National Bureau of Standards along with the "transfer standards". After data processing, the National Bureau of Standards informs each the lower-grade laboratory with system error and measurement error. In the next year, the National Bureau of Standards will send another two "transfer standards" to each laboratory, repeating the operation process of the previous year. The MAPS adopts a closed-loop method of quantity value transfer or quantity traceability. In the process of quantity value transfer, it not only evaluates a measurement accuracy of the measuring instrument of the lower-grade laboratory, but also evaluates technical grades of the lower-grade measurement personals and errors introduced by the laboratory work site conditions. In China, this method is applied in some specific on-site verification, calibration, and testing fields, but the "transfer standards" are not easy to obtain, and it is repetitive, labor-intensive and time-consuming. Therefore, it has not been widely promoted.

To verify measurement capabilities of domestic calibration laboratories, the China National Accreditation Service for Conformity Assessment (CNAS) has launched a "proficiency testing plan" or "measurement audit", requiring each laboratory to conduct a blind sample comparison. In particular, the laboratory in charge of the blind sample comparison first selects a batch of "samples" with stable performance, measures the batch of "samples" in accordance with corresponding verification regulations/calibration specifications or comparison specifications, and archives measurement data; and then sends the "sample" with known measurement data to a compared laboratory, but the relevant measurement data of the sample are kept confidential to the compared laboratory; and afterwards the compared laboratory is required to measure the same sample in accordance with corresponding verification regulations/calibration specifications or comparison specifications, and to send the sample and measurement data back to the laboratory in charge of the comparison; and the laboratory in charge of the comparison will process the relevant measurement data, so as to verify the measurement ability of the compared laboratory. Because the relevant data of the comparison sample are not disclosed before and after the comparison, so it is called as blind sample comparison. The "proficiency testing plan" or "measurement audit" program launched by CNAS is roughly the same as the MAPS method of quantity value transfer or quantity value traceability, so it belongs to the same kind of method as the MAPS.

Although the first, second, and fourth methods of quantity value transfer or quantity value traceability in the existing quantity value transfer or traceability methods are different in measuring instruments, and quantity value transfer or traceability processes, there is little difference in their substantive contents, and all use physical standards to carry out face-to-face local quantity value transfer or traceability. For this type of quantity value transfer or traceability method, regardless of the enterprise requiring quantity value transfer or traceability send measuring instruments to-be-inspected to a superior metrological verification/calibration institution for verification/calibration (shorted as sending for inspection), or the enterprise requiring quantity value transfer or traceability invites technicians of the superior metrological verification/calibration institution to its own site to perform verification/calibration on measuring instrument to-be-inspected (shorted as on-site inspection), from the perspective of labor productivity, most of the quantity value transfer or traceability processes are single-piece purely manual production; and moreover there are many inconvenient factors in the sending for inspection or contacting technicians to carry out the on-site inspection, which make this type of quantity value transfer or traceability methods have the following problems:

1) the entire process of quantity value transfer or traceability is almost purely manual operation, not only the labor cost is high, but also the preparation and operation time is too long, the efficiency is low and the timeliness is low. A time for completing the process of quantity value transfer or traceability of a measuring instrument at least ranges from three to five days, or more than ten days, or even one or two months. Therefore, it is very incompatible with requirements of real-time and efficient for automatic, and intelligent or intelligent productions in modern society.

2) Manual handling of measuring instruments is required regardless of the technicians are invited to perform the on-site inspection or the manual sending for inspection, which is not only labor-intensive and time-consuming, but also damage of measuring instruments caused by manual disassembly, handling and road transportation would be occurred from time to time.

3) The existing methods of quantity value transfer are from measurement base instrument to measurement standard instruments at various grades until work measuring apparatuses. Measurement data at each grade cannot be fed back in time, and thus timeliness, accuracy and reliability of transferred data of users and laboratories cannot be guaranteed.

4) Verification/calibration results of the measuring instruments to-be-inspected are measured under specific environmental conditions of a standard laboratory of the superior metrological technical institution, and the specific environmental conditions are often very different from the actual use environmental conditions on the customer's site.

5) At present, most of measuring instruments each have a fixed verification period or calibration time interval. In the fixed verification period or calibration time interval, some are out of tolerance, and some are good in performance thus still qualified. If the measuring instrument with out-of-tolerance is not removed, it will still transfer the quantity value downwardly, resulting in great harm. In another aspect, it is inevitably to waste a lot of manpower and material resources to re-verify/re-calibrate the measuring instrument with good performance and being not out-of-tolerance. Therefore, the government's requirements are that: prefer to sacrifice manpower and material resources to ensure that the measuring instruments are sent for inspection at the fixed verification periods or calibration intervals to thereby ensure accuracy and reliability of quantity values; and for those key measuring instruments, it is further required to add an additional intermediate checks (run check) procedure at the sites of the measuring instruments being verified/calibrated within verification periods or calibration time intervals o the measuring instruments. Although the intermediate checks (run check) procedure is much simpler in operation than the formal verification or calibration procedure, because it only assesses stability of the measuring instrument, due to on-site personnel costs and technical problems, the intermediate checks (run check) procedure is basically difficult to adhere to for a long time.

6) The "transfer standard" of MAPS and the comparison "blind sample" of the "proficiency testing plan" of CNAS both are "physical measuring tools" or physical standards that are stable in quantity value and easy to carry or handle, have great application limitations and thus can only be used under partial or specific conditions. In the process of standard transfer of MAPS or the "blind sample" comparison of the "proficiency testing plan" of CNAS, it is necessary for staff of superior and lower-grade metrological technical institutions to carry out multiple repeated measurements on the measuring instrument involved in the quantity value transfer or traceability, and needs two or more than two round-trip transportations, which is time-consuming and labor-intensive. This method is acceptable for the proficiency verification (or assessment) of relevant (same grade or lower-grade) metrological technical institutions by an administrative department or the superior metrological technical institution, but it is not suitable for the needs of periodic quantity value transfer or traceability of measuring instruments with a large quantity and a wide use range, especially of work measuring apparatuses.

The above-mentioned third method of "using broadcast standard signals for quantity value transfer or traceability" does not require the manual handling of measuring instrument, which can save transportation costs and shorten the preparation time for inspection, but at present, the quantity value transfer or traceability method:

1) is only suitable for very few situations such as a time-frequency signal transmission (such as "GPS satellite common-view remote time-frequency transmission", "femtosecond laser frequency comb time-frequency remote calibration") that does not require a physical measuring tool for transfer or traceability and its signal transmission path does not have a significant impact on its accuracy, or a wireless remote quantity value transfer or traceability of TV standard format ratio signal; and thus it is difficult to promote and apply in other metrological fields.

2) is low in automation for its existing process of quantity value transfer or traceability, and many operations such as signal capturing, debugging, and stabilizing are almost purely manual operations, which are labor-intensive and time-consuming.

SUMMARY OF THE DISCLOSURE

In view of the shortcomings of the prior art, the disclosure provides a measuring instrument and a method of remote quantity value transfer/traceability of the measuring instrument that are convenient for carrying out quantity value transfer/traceability.

Accordingly, in the first aspect, an embodiment of the disclosure provides a measuring instrument including a local quantity value transfer/traceability component, a remote quantity value transfer/traceability component, a remote communication component and a central processing component; the local quantity value transfer/traceability component, the remote quantity value transfer/traceability component and the remote communication component are connected with the central processing component; a metrological grade of the remote quantity value transfer/traceability component is greater than or equal to that of the local quantity value transfer/traceability component; the remote quantity value transfer/traceability component is one of a meter category component and a source category component, and the local quantity value transfer/traceability component is the other one of the meter category component and the source category component; and the remote quantity value transfer/traceability component is configured to provide one of an in-machine high-grade metrological standard and a remote high-grade metrological standard for the local quantity value transfer/traceability component and thereby to perform quantity value transfer/traceability to the local quantity value transfer/traceability component by using one of the in-machine metrological standard and the remote high-grade metrological standard.

As a further improvement of the above embodiment, the measuring instrument further includes a quantity value transfer/traceability switching component; the quantity value transfer/traceability switching component is connected with the local quantity value transfer/traceability component, the remote quantity value transfer/traceability component and the central processing component, and configured to switch on connection between the local quantity value transfer/traceability component and the remote quantity value transfer/traceability component, or switch off connection between the local quantity value transfer/traceability component and the remote quantity value transfer/traceability component.

As a further improvement of the above embodiment, the measuring instrument further includes an external connection interface; the quantity value transfer/traceability switching component is further configured to make an external metrological device connected to the external connection interface connect with the local quantity value transfer/traceability component or the remote quantity value transfer/traceability component.

As a further improvement of the above embodiment, the remote quantity value transfer/traceability component includes an in-machine high-grade metrological standard component and a quantity value transfer/traceability standard switching component connected with the in-machine high-grade metrological standard component; and the quantity value transfer/traceability standard switching component is configured to make the local quantity value transfer/traceability component perform quantity value transfer/traceability through the in-machine high-grade metrological standard component, or make the local quantity value transfer/traceability component perform quantity value transfer/traceability according to the remote high-grade metrological standard obtained from the remote communication component.

As a further improvement of the above embodiment, the remote quantity value transfer/traceability component further includes an installation component and a detection component; the in-machine high-grade metrological standard component is detachably connected with the installation component, and the detection component is configured to detect whether the in-machine high-grade metrological standard component is connected with the installation component to obtain a detection result, and send the detection result to the central processing component.

As a further improvement of the above embodiment, the measuring instrument further includes an external connection interface; the quantity value transfer/traceability standard switching component is further configured to make the external connection interface connect with the in-machine high-grade metrological standard component, and thereby to enable quantity value transfer/traceability between the in-machine high-grade metrological standard component and an external metrological device connected to the external connection interface; and the external metrological device is configured to perform the quantity value transfer/traceability to the in-machine high-grade metrological standard component when a metrological grade of the external metrological device is greater than that of the in-machine high-grade metrological standard component; or the in-machine high-grade metrological standard component is configured to perform the quantity value transfer/traceability to the external metrological device when the metrological grade of the external metrological device is less than that of the in-machine high-grade metrological standard component.

As a further improvement of the above embodiment, the remote quantity value transfer/traceability component includes an in-machine high-grade metrological standard component, and the in-machine high-grade metrological standard component is configured to at least provide at least one of high-grade metrological standards of a "zero" value, a "full scale" value and/or a "median" value in a measurement range of the local quantity value transfer/traceability module.

As a further improvement of the above embodiment, the measuring instrument further includes an external connection interface, and having at least one of a local quantity value transfer/traceability mode, a remote quantity value transfer/traceability mode, and an intermediate quantity value transfer/traceability mode;

the remote quantity value transfer/traceability component is disconnected from the local quantity value transfer/traceability component and the local quantity value transfer/traceability component is configured to perform quantity value transfer/traceability to external, when in the local quantity value transfer/traceability mode;

the remote quantity value transfer/traceability component is connected to the local quantity value transfer/traceability component and is configured to perform quantity value transfer/traceability to the local quantity value transfer/traceability component, when in the remote quantity value transfer/traceability mode; and one of the remote quantity value transfer/traceability component and the local quantity value transfer/traceability component is configured to perform quantity value transfer/traceability to an external metrological device connected to the external connection interface, when in the intermediate quantity value transfer/traceability mode.

As a further improvement of the above embodiment, the local quantity value transfer/traceability component is configured to perform quantity value transfer/traceability to the external metrological device connected to the external connection interface when in the intermediate quantity value transfer/traceability mode that a category of the remote quantity value transfer/traceability component is the same as that of the external metrological device connected to the external connection interface; or the remote quantity value transfer/traceability component is configured to perform quantity value transfer/traceability to the external metrological device connected to the external connection interface when in the intermediate quantity value transfer/traceability mode that a category of the local quantity value transfer/traceability component is the same as that of the external metrological device connected to the external connection interface;

or, the remote quantity value transfer/traceability component is configured to perform quantity value transfer/traceability to the external metrological device by using the in-machine high-grade metrological standard or the remote high-grade metrological standard when the remote quantity value transfer/traceability component performs quantity value transfer/traceability to the external metrological device connected to the external connection interface in the intermediate quantity value transfer/traceability mode.

As a further improvement of the above embodiment, the remote quantity value transfer/traceability component includes an in-machine high-grade metrological standard component and a quantity value transfer/traceability standard switching component connected with the in-machine high-grade metrological standard component, and the quantity value transfer/traceability standard switching component is configured to perform remote quantity value transfer/traceability to the in-machine high-grade metrological standard component according to the remote high-grade metrological standard obtained from the remote communication component.

In the second aspect, an embodiment of the disclosure provides a measuring instrument including: a local quantity value transfer/traceability component, a remote communication component and a central processing component; the local quantity value transfer/traceability component and the remote communication component are connected with the central processing component, the local quantity value transfer/traceability component is a meter category component, the measuring instrument is configured to obtain a remote high-grade metrological standard from external through the remote communication component, and the central processing component is configured to control the local quantity value transfer/traceability component to perform metrological operation to the remote high-grade metrological standard.

As a further improvement of the above embodiment, the central processing component is configured to send a metrological result of the local quantity value transfer/traceability component to an external device through the remote communication component.

As a further improvement of the above embodiment, a signal of the remote high-grade metrological standard from external through the remote communication component obtained by the measuring instrument is a digital signal or an analog signal; the measuring instrument includes a signal demodulator configured to demodulate the signal of the remote high-grade metrological standard through the remote communication component; and/or the local quantity value transfer/traceability component includes a sensor and a measurer connected to the sensor, the sensor is configured to detect an object to be detected and generate an electrical signal, the measurer is configured to perform metrological operation (also referred as perform measurement) to the electrical signal of the sensor thereby obtain a metrological result of the object to be detected, the central processing component is configured to make the measurer perform the metrological operation to the electrical signal of the sensor in a first state, and make the measurer perform metrological operation to the remote high-grade metrological standard in a second state; and/or the measuring instrument is selected from the group consisting of a voltage measuring instrument, a current measuring instrument, a resistance measuring instrument, a capacitance measuring instrument, an inductance measuring instrument, a temperature measuring instrument, a humidity measuring instrument, a weight measuring instrument, a pressure measuring instrument and a liquid level measuring instrument; the remote high-grade metrological standard correspondingly is selected from the group consisting of a voltage measuring standard, a current measuring standard, a resistance measuring standard, a capacitance measuring standard, an inductance measuring standard, a temperature measuring standard, a humidity measuring standard, a weight measuring standard, a pressure measuring standard and a liquid level measuring standard.

As a further improvement of the above embodiment, the measuring instrument further includes an external connection interface; the central processing component is further configured to make an external metrological device connected to the external connection interface perform metrological operation to the remote high-grade metrological standard, receive a metrological result from the external metrological device connected to the external connection interface, and send the metrological result to an external device through the remote communication component.

In the third aspect, an embodiment of the disclosure provides a method of remote quantity value transfer/traceability of a measuring instrument, the measuring instrument is a meter category component, the method includes:

obtaining a remote high-grade metrological standard through remote communication by the measuring instrument, a metrological grade of the remote high-grade metrological standard is greater than that of the measuring instrument;

performing metrological operation to the remote high-grade metrological standard to thereby obtain a metrological result by the measuring instrument; and sending the metrological result of the measuring instrument to an external device through remote communication.

As a further improvement of the above embodiment, the method further includes: obtaining a quantity value transfer/traceability result according to the metrological result of the measuring instrument, and generating a verification certificate or report of the measuring instrument, by the external device.

As a further improvement of the above embodiment, the measuring instrument is selected from the group consisting of a voltage measuring instrument, a current measuring instrument, a resistance measuring instrument, a capacitance measuring instrument, an inductance measuring instrument, a temperature measuring instrument, a humidity measuring instrument, a weight measuring instrument, a pressure measuring instrument and a liquid level measuring instrument; the remote high-grade metrological standard correspondingly is selected from the group consisting of a voltage measuring standard, a current measuring standard, a resistance measuring standard, a capacitance measuring standard, an inductance measuring standard, a temperature measuring standard, a humidity measuring standard, a weight measuring standard, a pressure measuring standard and a liquid level measuring standard.

As a further improvement of the above embodiment, the measuring instrument includes a sensor and a measurer connected to the sensor, the sensor is configured to detect an object to be detected and generate an electrical signal, the measurer is configured to perform metrological operation to the electrical signal of the sensor thereby obtain a metrological result of the object to be detected; and the measurer is configured to perform metrological operation to the electrical signal of the sensor in a first state, and perform metrological operation to the remote high-grade metrological standard in a second state.

As a further improvement of the above embodiment, after obtaining the remote high-grade metrological standard through remote communication, the method further includes: performing signal demodulation to the remote high-grade metrological standard, and the measuring instrument performs the metrological operation to the remote high-grade metrological standard after signal demodulation.

In the fourth aspect, an embodiment of the disclosure provides a method of remote quantity value transfer/traceability by using a measuring instrument, the measuring instrument includes a local quantity value transfer/traceability component, an in-machine high-grade metrological standard component and a remote communication component, the local quantity value transfer/traceability component is a source category component, the in-machine high-grade metrological standard component is a meter category component, a metrological grade of the in-machine high-grade metrological standard component is greater than or equal to that of the local quantity value transfer/traceability component, the method includes:

performing metrological operation to one of the local quantity value transfer/traceability component and a measuring instrument to be detected from external connected with the measuring instrument by using the in-machine high-grade metrological standard component to obtain a first metrological result, and the measuring instrument to be detected from external is the source category component;

obtaining a remote metrological standard signal from the remote communication component, and performing metrological operation to the remote metrological standard signal by using the in-machine high-grade metrological standard component to obtain a second metrological result;

obtaining a quantity value transfer/traceability result of the one of the local quantity value transfer/traceability component and the measuring instrument to be detected from external by comparing the first metrological result and the second metrological result.

As a further improvement of the above embodiment, the measuring instrument has an intermediary mode, the in-machine high-grade metrological standard component obtains the first metrological result by performing metrological operation to the measuring instrument to be detected from external, when the measuring instrument to be detected from external is the source category component and connected with the measuring instrument in the intermediary mode.

As a further improvement of the above embodiment, the method further includes: performing metrological operation to one of the local quantity value transfer/traceability component and the measuring instrument to be detected from external by using the in-machine high-grade metrological standard component to obtain a third metrological result;

obtaining the quantity value transfer/traceability result of the one of the local quantity value transfer/traceability component and the measuring instrument to be detected from external according to the third metrological result.

In the fifth aspect, an embodiment of the disclosure provides a method of remote quantity value transfer/traceability by using a measuring instrument, the measuring instrument includes a local quantity value transfer/traceability component, an in-machine high-grade metrological standard component and a remote communication component, the local quantity value transfer/traceability component is a meter category component, the in-machine high-grade metrological standard component is a source category component, a metrological grade of the in-machine high-grade metrological standard component is greater than or equal to that of the local quantity value transfer/traceability component, the method includes:

performing metrological operation to the in-machine high-grade metrological standard component by using one of the local quantity value transfer/traceability component and a measuring instrument to be detected from external connected with the measuring instrument to obtain a fourth metrological result, and the measuring instrument to be detected from external is the meter category component;

obtaining a remote metrological standard signal from the remote communication component, and performing metrological operation to the remote metrological standard signal by using the one of the local quantity value transfer/traceability component and the measuring instrument to be detected from external connected with the measuring instrument to obtain a fifth metrological result;

obtaining a quantity value transfer/traceability result of the in-machine high-grade metrological standard component by comparing the fourth metrological result and the fifth metrological result.

As a further improvement of the above embodiment, the measuring instrument further includes an external connection interface configured to connect with external metrological device;

the external metrological device performs quantity value transfer/traceability to the in-machine high-grade metrological standard component, when the external metrological device is the meter category component and a metrological grade of the external metrological device is greater than that of the in-machine high-grade metrological standard component; or the in-machine high-grade metrological standard component performs quantity value transfer/traceability to the external metrological device when the external metrological device is the meter category component and a metrological grade of the external metrological device is less than that of the in-machine high-grade metrological standard component.

As a further improvement of the above embodiment, the method further includes: performing metrological operation to the in-machine high-grade metrological standard component by using the local quantity value transfer/traceability component to obtain a sixth metrological result;

obtaining a quantity value transfer/traceability result of the local quantity value transfer/traceability component according to the sixth metrological result.

In the sixth aspect, an embodiment of the disclosure provides a method of remote quantity value transfer/traceability by using a measuring instrument, the measuring instrument includes a local quantity value transfer/traceability component, an in-machine high-grade metrological standard component and a remote communication component, the local quantity value transfer/traceability component is a meter category component, the in-machine high-grade metrological standard component is a source category component, the method includes:

performing metrological operation to the in-machine high-grade metrological standard component by using local quantity value transfer/traceability component to obtain a seventh metrological result;

sending a remote metrological standard signal to a remote measuring instrument through the remote communication component by the in-machine high-grade metrological standard component, the remote measuring instrument performs metrological operation to the remote metrological standard signal to obtain an eighth metrological result; or performing metrological operation to the in-machine high-grade metrological standard component by using a measuring instrument from external connected with the measuring instrument to obtain a ninth metrological result, the measuring instrument from external connected with the measuring instrument is the meter category component, and its metrological grade is greater than the local quantity value transfer/traceability component;

obtaining a quantity value transfer/traceability result of the local quantity value transfer/traceability component by comparing the seventh metrological result and the eighth metrological result or comparing the seventh metrological result and the ninth metrological result.

In the seventh aspect, an embodiment of the disclosure provides a method of remote quantity value transfer/traceability by using a measuring instrument, the measuring instrument includes a local quantity value transfer/traceability component, an in-machine high-grade metrological standard component and a remote communication component, the local quantity value transfer/traceability component is a meter category component, the in-machine high-grade metrological standard component is a source category component, the method includes:

performing metrological operation to the in-machine high-grade metrological standard component by using a measuring instrument to be detected from external connected to the measuring instrument to obtain a tenth metrological result; the measuring instrument to be detected from external is the meter category component;

sending a remote metrological standard signal to a remote measuring instrument through the remote communication component by the in-machine high-grade metrological standard component, the remote measuring instrument performs metrological operation to the remote metrological standard signal to obtain an eleventh metrological result;

obtaining a quantity value transfer/traceability result of the measuring instrument to be detected from external by comparing the tenth metrological result and the eleventh metrological result.

The measuring instrument and the method of remote quantity value transfer/traceability provided by the embodiments of the disclosure can perform quantity value transfer/traceability to the measuring instrument in a remote manner, so that the quantity value transfer/traceability of the measuring instrument becomes very convenient, simple and less costly.

BRIEF DESCRIPTION OF THE DRAWINGS

The above-mentioned and other objectives, features and advantages of the disclosure will become clearer through more specific description of further embodiments of the disclosure shown in the accompanying drawings. In all the drawings, the same reference numerals indicate the same parts, and the drawings are not drawn to scale in equal proportion according to actual sizes, and a main point is to show the gist of the disclosure.

DETAILED DESCRIPTION OF EMBODIMENTS

Figure 1:
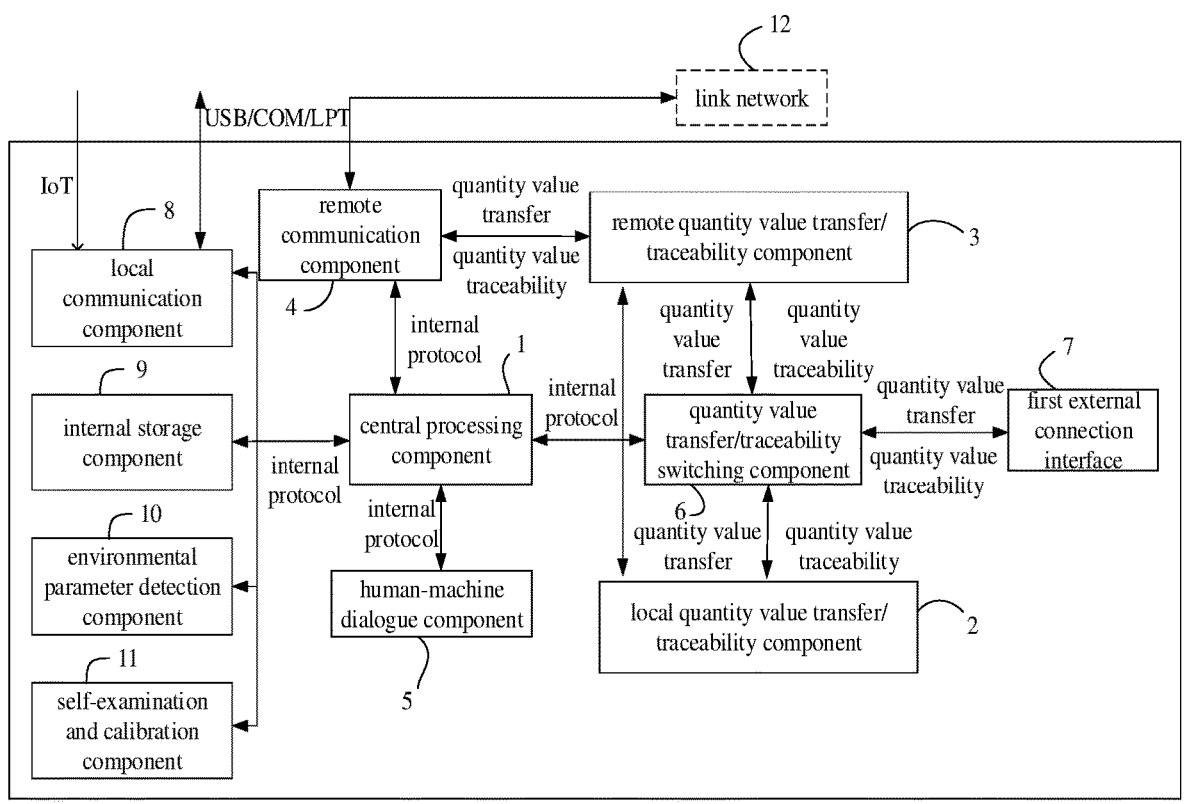
FIG. 1 is a schematic structural view of a measuring instrument according to an embodiment of the disclosure.

In order to facilitate the understanding of the disclosure, the disclosure will be described more comprehensively below with reference to the relevant drawings.

It should be noted that when an element is considered to "connected" to/with another element, it may be directly connected to and integrated with another element, or there may be an intermediate element existed therebetween instead. The terms "installed/mounted", "one end", "other end" and similar expressions used herein are for illustrative purposes only.

Unless otherwise stated, all technical and scientific terms used herein have the same meanings as those commonly understood by those skilled in the technical field of the disclosure. The terms used in the specification of the disclosure are only for the purpose of describing specific embodiments, and are not intended to limit the disclosure. The term "and/or" used in the specification includes any and all combinations of one or more related listed items.

Please refer to FIG. 1 to FIG. 4, an embodiment of the disclosure provides a measuring instrument, including a local quantity value transfer/traceability component 2, a remote quantity value transfer/traceability component 3, a remote communication component 4 and a central processing component 1. The local quantity value transfer/traceability component 2, the remote quantity value transfer/traceability component 3 and the remote communication component 4 are connected with the central processing component 1. A metrological grade of the remote quantity value transfer/traceability component 3 is greater than or equal to that of the local quantity value transfer/traceability component 2. The remote quantity value transfer/traceability component 2 is one of a meter category component and a source category component, and the local quantity value transfer/traceability component 3 is the other one of the meter category component and the source category component, that is, the remote quantity value transfer/traceability component 3 is the meter category component when the local quantity value transfer/traceability component 2 is the source category component, or the remote quantity value transfer/traceability component 3 is the source category component when the local quantity value transfer/traceability component 2 is the meter category component. The remote quantity value transfer/traceability component 3 is configured to provide an in-machine high-grade metrological standard or a remote high-grade metrological standard for the local quantity value transfer/traceability component 2 and thereby to perform quantity value transfer/traceability to the local quantity value transfer/traceability component 2 by using one of the in-machine metrological standard and the remote high-grade metrological standard. The measuring instrument can be selected from the group consisting of the thermometer, the voltmeter, the ammeter, the high-performance liquid chromatography, the photoelectric detector, the standard capacitor box, the digital multimeter calibrator, the electric energy meter verification device, the harmonic power standard and the standard ultrasound, etc. The source category component refers to that the component has the characteristics of a standard source and is used as an output component to provide input for other measuring instruments/components. The source category component can be selected from the group consisting of the gauge block, the weight, the standard pH solution, the standard voltage signal generation circuit and the standard signal generation software module, etc.; the meter category component refers to that the component has the characteristics of a standard meter and has an input component to detect the input provided by the source category component of this measuring instrument or other measuring instruments. The meter category component can be selected from the group consisting of the caliper, the sensor, the pressure gauge and the voltage detection circuit, etc.

It should be noted that, when the metrological grade of the remote quantity value transfer/traceability component 3 is greater than that of the local quantity value transfer/traceability component 2, it can reduce an indication error of the local quantity value transfer/traceability component 2 by correcting the local quantity value transfer/traceability component 2 after the quantity value transfer/traceability module 3 performs quantity value transfer/traceability to the local quantity value transfer/traceability component 2. When the metrological grade of the remote quantity value transfer/traceability component 3 is equal to that of the local quantity value transfer/traceability component 2 and after the quantity value transfer/traceability module 3 performs quantity value transfer/traceability to the local quantity value transfer/traceability component 2, it also can reduce the indication error of the local quantity value transfer/traceability component 2 by correcting the local quantity value transfer/traceability component 2 if the indication error of the local quantity value transfer/traceability component 2 becomes larger than its initial state. The metrological grades of the in-machine high-grade metrological standard and the remote high-grade metrological standard may be greater than or equal to the metrological grade of the local quantity value transfer/traceability component 2, which means that the stability of metrology is better than or equal to that of the local quantity value transfer/traceability component 2.

The local quantity value transfer/traceability component 2 can include an output component and/or an input component. The output component belongs to the standard source category measuring instrument or a part thereof. From the physical measuring tool with the single function (such as the gauge block, the weight, the national standard material, etc.) to the signal generator with adjustable signal amplitude, frequency and modulation format including the digital-to-analog conversion module, the signal generation/synthesis/modulation module, the power amplifier module, the output conversion and matching module, etc. are all belong to the scope of the standard source or output component. In different measuring instruments, the degree of simplicity or complexity embodied is different. A single-function physical measuring tool is a special case of a standard source or the output component. The input component belongs to the standard meter category measuring instrument or a part thereof, from the single-function measuring meter (such as the indicator meter, the pointer pressure gauge, the general caliper, etc.) to the measuring receiver with measuring range, bandwidth, modulation format and amplitude, etc. Different measuring instruments have different degrees of simplicity or complexity. The input component or the standard meter category measuring instruments generally includes an input conversion/demodulation and matching module, a test module (including various test sensors), a sample/hold module, an analog-to-digital conversion module, and so on. single-function test meters are special cases of the standard meters or the input component.

The measuring instruments including four types of the measuring meter, the sensor, the measuring tool, the standard material are equivalent to the output components with the standard source category and directly output the standard parameters, such as the gauge blocks, the weights, the standard viscosity fluids, the acoustic calibrators, the luminous intensity standard lamps, the medical standard radioactive sources, the standard signal generators, the standard time-frequency signal broadcasts by the radio station, various attenuators or the output terminals of the sensor; etc.; or the measuring instruments are equivalent to the input components with the standard meter category and the directly test the tested parameters of their input ports, such as the indicator meters, the pointer pressure gauges, the glass liquid thermometers, the rotary viscometers or the outflow cup viscometers, various attenuators or sensor input terminals; or the measuring instruments have both output components with the standard source category and input components with the standard meter category, such as certain standard signal generators, various attenuators or sensors, etc.

The local quantity value transfer/traceability component 2 can directly connect to the input port of an external device or other measuring instrument and directly output the corresponding value to the external device or other measuring instrument, when the local quantity value transfer/traceability component 2 is used as the output component. The local quantity value transfer/traceability component 2 can directly connect to the output port of the external device or other measuring instrument, and directly test the corresponding value of the input port connected to the output port of the external equipment or other measuring instruments, when the local quantity value transfer/traceability component 2 is used as the input component.

The measuring instrument can also include a human-machine dialogue component 5, through which the measuring instrument can be operated according to people's intentions through the human-machine dialogue. There are many ways to realize man-machine dialogue, in addition to remote control, at the site of the exanimated (calibrated) measuring instrument, people use keyboard, mouse, buttons, software and hardware switches, external analog or digital parameters and other input tools to input the information that they want to input to standard or exanimated (calibrated) measuring instruments; the standard or exanimated (calibrated) measuring instruments output information to people through various displays (such as LED/LCD digital/dot matrix displays, etc.), voice prompts, sound and light alarms and other output tools, or external output analog or digital parameters, it let people perceive the reaction of measuring instruments and the amount of quantity value transfer/traceability data.

The central processing component 1 can include a central processing component such as the CPU (central processing unit) or the MPU (Microprocessor Unit), or a host system built with the CPU or the MPU as a core, including hardware or software. After the measuring instrument has the central processing component 1, people can freely control the measuring instrument by programming and make it run according to people's wishes. The central processing component 1 can control the local quantity value transfer/ traceability component 2, the remote quantity value transfer/traceability component 3, the remote communication component 4, etc. through internal protocols. The internal protocols generally refer to all protocols that realize mutual communication or link in the same measuring instrument or the same system, including part or all of the protocols such as human-computer interaction protocol, software/hardware (interface) protocol, chip bus (C-Bus) protocol, internal bus (I-Bus) protocol. With the development of integrated circuit technology, some of the external bus (E-Bus) protocols are also included in the internal protocol after the external bus (E-Bus) is integrated into the chip.

The remote communication component 4 has various types and structures, such as the Wi-Fi module, the 3G module, the 4G module, the 5G module, etc. The remote communication component 4 utilize the resources of the link network 12 to form a network to provide remote communication or remote-control functions. The link network 12 generally refers to a general network such as social public, enterprise internal, family, and so on or private network. Commonly used link networks 12 include one of the wired networks, the wireless networks and the satellite networks, etc., or commonly used link networks 12 may be a hybrid network composed of two or three of the wired networks, the wireless networks and the satellite networks. The remote communication component 4 including the network interfaces and protocols can has the satellite network interfaces and protocols, the wireless network interfaces and protocols, the wired network interfaces and protocols, and so on. The satellite network interfaces and protocols include satellite positioning interfaces and protocols and satellite communication interfaces and protocols, etc. The wireless network interfaces and protocols include wireless positioning interfaces and protocols and wireless communication interfaces and protocols, etc. The wired network interfaces and protocols include wired positioning interfaces and protocols and wired communication interfaces and protocols. Commonly used satellite positioning interfaces and protocols are Global Navigation Satellite System (GNSS), including but not limited to: GPS (Global Positioning System) protocol, BDS (BeiDou Navigation Satellite System) protocol, GLONASS protocol, Galileo protocol, etc. The more common ones are NMEA (National Marine Electronics Association)-0183 standard protocol, etc.; Commonly used wireless positioning interfaces and protocols include but are not limited to: LBS (Location Based Service) or MPS (Mobile Position System), identification pole number positioning along the road, etc. Commonly used wired positioning interfaces and protocols include but are not limited to IP (Internet Protocol) address positioning and protocols. Common satellite communication interfaces and protocols include but are not limited to: CCS-IoT (Coordinated Control System-Internet of things), SNB-IoT, SOC, MOZIQC, etc. Commonly used wireless communication interfaces and protocols include but are not limited to: IoT (Internet of things), NB-IoT (Narrow Band Internet of Things), WLAN (Wireless Local Area Network), GPRS (General Packet Radio Service), SMS (Short Message Service), etc. Common wired communication interfaces and protocols include but are not limited to: ADSL (Asymmetric Digital Subscriber Line), LAN (Local Area Network), FTTX+LAN (Fiber To The X+Local Area Network), 100 BaseT LAN, LXI (LAN extension for instrumentation)-A/B/C etc.

The main function of the remote quantity value transfer/traceability component 3 is to provide high-grade metrological standards for the measuring instrument to achieve remote quantity value transfer/traceability, the high-grade metrological standards include the in-machine high-grade metrological standard and remote high-grade metrological standard. The remote quantity value transfer/traceability component 3 is a meter category component (input module) when the local quantity value transfer/traceability component 2 is an source category component (output module), or the remote quantity value transfer/traceability component 3 is the source category component (output module) when the local quantity value transfer/traceability component 2 is the meter category component (input module), that is the remote quantity value transfer/traceability component 3 and the local quantity value transfer/traceability component 2 are mutually input and output. Corresponding to the output or input port of the local quantity value transfer/traceability component 2, and the remote quantity value transfer/traceability component 3 needs to be configured as the input or output port. If the local quantity value transfer/traceability component 2 meets the above-mentioned standard meter category conditions and its output or input port is in the input mode, the remote quantity value transfer/traceability component 3 will correspondingly meet the above-mentioned standard source category conditions, and its stability is better than or equal to the standard source of the local quantity value transfer/traceability component 2, its input or output port will be in output mode accordingly; In contrast, If the local quantity value transfer/traceability component 2 meets the above-mentioned standard source category conditions and its output or input port is in the output mode, the remote quantity value transfer/traceability component 3 will correspondingly meet the above-mentioned standard meter category conditions, and its stability is better than or equal to the standard instrument of the local quantity value transfer/traceability component 2, its input or output port will be in input mode accordingly.

The remote quantity value transfer/traceability component 3 provides one of the in-machine high-grade metrological standard and the remote high-grade metrological standard to the local quantity value transfer/traceability component 2, performs quantity value transfer/traceability to the local quantity value transfer/traceability component 2 by using the one of the in-machine high-grade metrological standard and the remote high-grade metrological standard. The accuracy or stability of the one of the in-machine high-grade metrological standard and the remote high-grade metrological standard is better than that of the local quantity value transfer/traceability component 2.

When the local quantity value transfer/traceability component 2 is the meter category component that meets the above standard meter category conditions, the in-machine high-grade metrological standard may be configured to the physical measuring tool or its equivalent, such as the indication stability is greater than that of the local quantity value transfer/traceability component, the in-machine high-grade standard source, the in-machine high-grade standard measuring tool or measuring tool group configured to quantity value transfer/traceability the basic test parameters of the local quantity value transfer/traceability component 2. For example, the in-machine standard for the length measuring instrument is a gauge block or its equivalent substance, which takes the output standard length as its most important or most basic technical parameter, the in-machine standard for the digital voltmeter is the standard voltage source or its equivalent material with the output voltage value as its most important or most basic technical parameter.

When the local quantity value transfer/traceability component 2 is a source category component that meets the above-mentioned standard source conditions, the in-machine high-grade metrological standard can be configured to the in-machine high-grade standard meter, the in-machine high-grade standard measuring instrument or its equivalent module (circuit), which the indication stability is greater than that of the local quantity value transfer/traceability component 2, and configured to quantity value transfer/traceability the basic test parameters of the local quantity value transfer/traceability component 2. For example, the in-machine standard for the signal generator of the output voltage is a high-grade standard voltmeter or its equivalent circuit for measuring the voltage value, the in-machine standard for the crystal oscillator that outputs the frequency signal is a high-grade general-purpose counter or frequency meter that measures the frequency value.

A physical measuring instrument refers to a measuring instrument that has an assigned value and reproduces in a fixed form or provides one or more measured values when in use. According to the number of known quantitative values that it reproduces or provides, physical measuring tools can be divided into single-value measuring tools (such as weights, gauge blocks, standard resistances, standard batteries, etc.) and multi-value measuring tools (such as indexed line pattern meter ruler, standard signal generator, etc.), group measuring tools (such as weight group, gauge block group, etc.); According to its working methods, physical measuring tools can be divided into independent measuring tools (such as rulers) and dependent measuring tools (such as weights). Any measuring tool that can be measured independently without the help of other measuring instruments is called independent measuring tool, and on the contrary is called dependent measuring tool. For example, the measuring instrument is a length gauge, and the most basic measurement parameter for quantity value transfer/traceability is length, the remote quantity value transfer/traceability component 3 is equipped with metal or ceramic gauge blocks or gauge block groups configured to quantity value transfer/traceability the most basic length measurement parameters of the length gauge and stability are better than the length measurement of the length gauge. By analogy, the dynamometer is equipped with a force weight or weight set, the digital thermometer is equipped with a pen-shaped pocket thermostat, the pH meter is equipped with a standard pH liquid and a small or pocket container, and the digital multimeter is equipped with a high-stability standard voltage source/current source/standard resistor and frequency meter are equipped with high-stability crystal oscillator, etc. Among them, the standard voltage source is a high-grade standard signal source, a single weight or gauge block is a standard measuring tool, and several weights and gauge blocks are a standard measuring tool group.

The equivalent substances of other similar physical measuring tools that have the characteristics of the stability of the displayed value of the physical measuring tool can be used in place of the above physical measuring tools. For example, certain length devices with display stability equivalent or better than gauge blocks, certain quality devices with display stability equivalent or better than weights, and certain containers with display stability equivalent or better than standard metal or glass gauges, etc. Other physical measuring tools analog substances, analog devices, or analog modules (circuits) that have the characteristics of the stability of the displayed value of the physical measuring tool can simulate the corresponding function or effect can also be used in place of the above physical measuring tools. For example, some standard resistor analog equivalent modules (circuits) with display stability equivalent or better than standard resistors, some force sensor force value simulation equivalent modules (circuits), that have display stability equivalent or better than standard force value weights, some analog equivalent modules (circuits) of thermocouples or platinum resistance thermometers that have display stability equivalent or better than standard thermocouples or platinum resistance thermometers, etc.

The remote quantity value transfer/traceability component 3 can use the in-machine high-grade metrological standard to perform quantity value transfer/traceability to the local quantity value transfer/traceability component 2, or it can perform remote quantity value transfer/traceability to the local quantity value transfer/traceability component 2 by using the remote high-grade metrological standard obtained from the remote communication component 4. Specifically, when the local quantity value transfer/traceability component 2 is the meter category component, the remote quantity value transfer/traceability component 3 makes the local quantity value transfer/traceability component 2 connect to the remote high-grade standard signal source through the remote communication component 4 and link network 12, the local quantity value transfer/traceability component 2 receives and performs metrological operation (also referred as performs measurement) to the standard signals from the remote high-grade standard signal source to achieve remote quantity value transfer/traceability of the measuring instrument. When the local quantity value transfer/traceability component 2 is the source category component, the local quantity value transfer/traceability component 2 outputs the measured signal data and connects with the external remote high-grade standard meter through the remote quantity value transfer/traceability component 3, the remote communication component 4 and the link network 12, and then the remote high-grade standard meter receives and measures the measured signal output by the measuring instrument to realize the remote quantity value transfer/traceability of the measuring instrument. In some embodiments, obtaining the remote high-grade metrological standard through the remote communication component 4 may be to download the remote high-grade metrological standard that has been converted into the relevant software program module through the remote communication component 4. In other embodiments, for some parametric quantities that cannot be directly propagated through the remote communication, such as length, weight, etc., it is possible to first convert these parametric quantities to parametric quantities that can be propagated remotely, for example to time-frequency signals propagated through radio, and then the remote communication component 4 receives the remote high-grade standard that has been converted to a time-frequency signal. The local quantity value transfer/traceability component 2 should match the form exhibited by the remote high-grade standard and be able to quantity value transfer/traceability according to that remote high-grade standard.

In a further embodiment, the measuring instrument further includes a quantity value transfer/traceability switching component 6, the quantity value transfer/traceability switching component 6 is connected with the local quantity value transfer/traceability component 2, the remote quantity value transfer/traceability component 3 and the central processing component 1, and configured to switch on connection between the local quantity value transfer/traceability component 2 and the remote quantity value transfer/traceability component 3, or switch off connection between the local quantity value transfer/traceability component 2 and the remote quantity value transfer/traceability component 3. In a further embodiment, the measuring instrument further includes a first external connection interface 7, the quantity value transfer/traceability switching component 6 is further configured to make an external metrological device 200 connected to the first external connection interface 7 connect with the local quantity value transfer/traceability component 2 or the remote quantity value transfer/traceability component 3. In another embodiment, the first external connection interface 7 is directly connected to the local quantity value transfer/traceability component 2, and the quantity value transfer/traceability switching component 6 cannot control the connection or disconnection of the first external connection interface 7 to the local quantity value transfer/traceability component 2, but can only control the connection or disconnection of the local quantity value transfer/traceability component 2 to the remote quantity value transfer/traceability component 3. This first external connection interface 7 matches the local quantity value transfer/traceability component 2 and can be a signal input and/or output interface, for example, it can be a USB interface, a network connection interface, a video/audio signal output plug, a standard source mounting platform, etc.

Figure 2A:
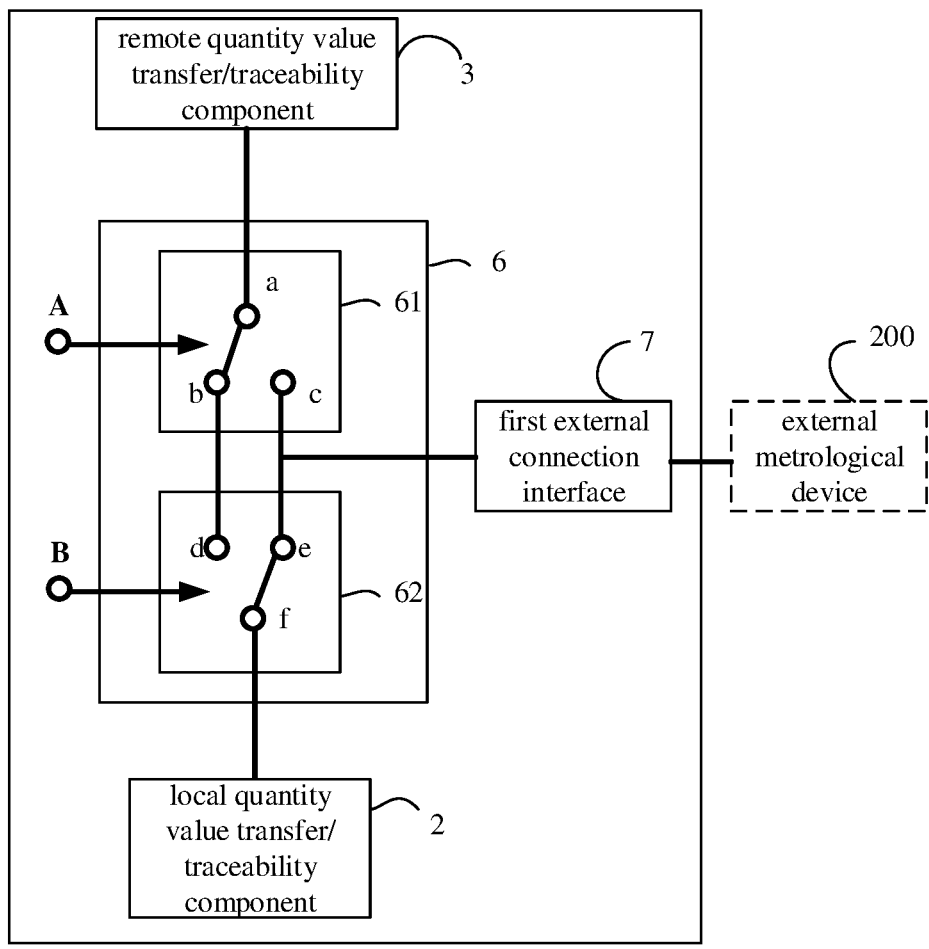
FIG. 2a is a schematic view of a connection of a quantity value transfer/traceability switching component of FIG. 1 in a quantity value transfer/traceability mode.
Figure 2B:
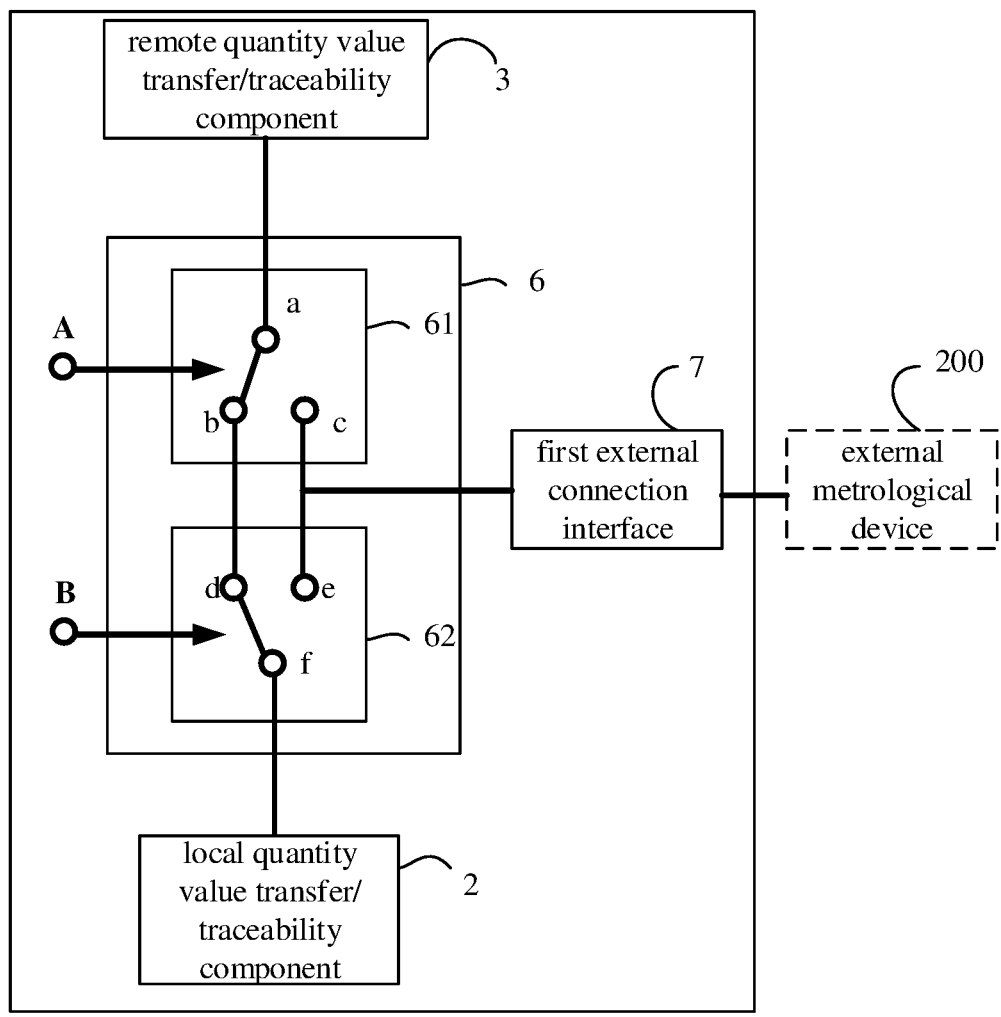
FIG. 2b is a schematic view of a connection of the quantity value transfer/traceability switching component of FIG. 1 in another quantity value transfer/traceability mode.
Figure 2C:
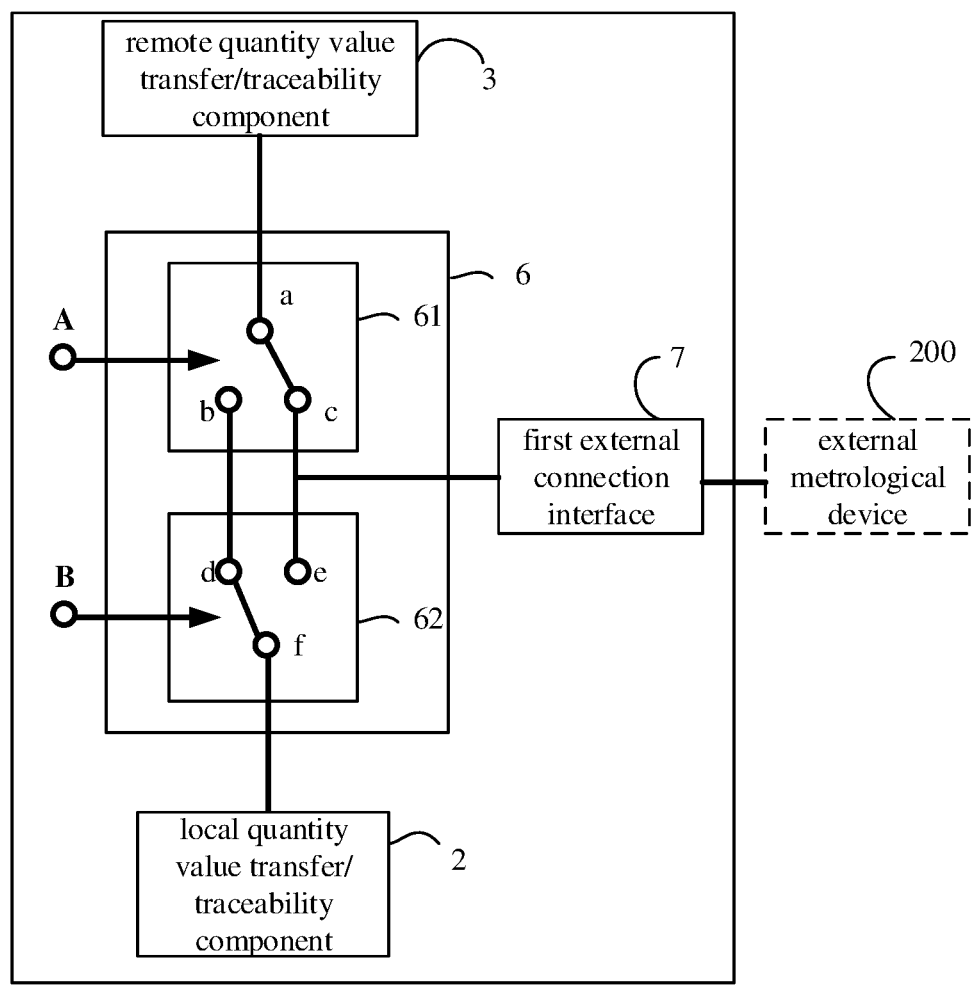
FIG. 2c is a schematic view of a connection of the quantity value transfer/traceability switching component of FIG. 1 in further another quantity value transfer/traceability mode.

Referring to FIG. 2a, FIG. 2b, and FIG. 2c, the quantity value transfer/traceability switching component 6 includes a first selector switch 61 and a second selector switch 62, and both the first selector switch 61 and the second selector switch 62 can be "binary" switches, which act through two control signals of A and B, respectively. The a common end of the first selector switch 61 is connected to the remote quantity value transfer/traceability component 3, the f common end of the second selector switch 62 is connected to the local quantity value transfer/traceability component 2, the c end of the first selector switch 61 and the e end of the second selector switch 62 are both connected to the first external connection interface 7, and the b end of the first selector switch 61 is connected with the d end of the second selector switch 62.

In the local quantity value transfer/traceability mode, please refer to FIG. 2a, by the two control signals A and B, the a end of the first selector switch 61 is connected to the b end, and the f end of the second selector switch 62 is connected to the e end, thereby making the remote quantity value transfer/traceability component 3 disconnected from the local quantity value transfer/traceability component 2, and the local quantity value transfer/traceability component 2 connected to the first external connection interface 7 and performs quantity value transfer/traceability to external through the first external connection interface 7, this is also the normal operation mode of the measuring instrument. When the local quantity value transfer/traceability component 2 is the source category component, it outputs a signal to the external metrological device 200 connected to the first external connection interface 7, and when the local quantity value transfer/traceability component 2 is meter category component, it measures the relevant signal input from the external metrological device connected to the first external connection interface 7.

In the remote quantity value transfer/traceability mode, refer to FIG. 2b, Through the two control signals of A and B, the a end of the first selector switch 61 is connected to the b end and the f end of the second selector switch 62 is connected to the d end, thereby making the remote quantity value transfer/traceability component 3 connect to the local quantity value transfer/traceability component 2, and the local quantity value transfer/traceability component 2 disconnect from the first external connection interface 7, and the remote quantity value transfer/traceability of the local quantity value transfer/traceability component 2 is performed through the remote quantity value transfer/traceability component 3.

In the intermediary quantity value transfer/traceability mode, the measuring instrument performs quantity value transfer/traceability to the external measuring instrument connected to the first external connection interface 7. When the remote quantity value transfer/traceability component 3 of the measuring instrument and the external metrological device 200 to be verified are the same source category device or the same meter category component device (i.e., both are of the same type), the central processing component 1 makes the first selection switch 61 and the second selection switch 62 change to the connection mode shown in FIG. 2a through two control signals of A and B, i.e., the same connection mode as in the normal operation mode of the measuring instruments, the local quantity transfer/traceability component 2 performs quantity transfer/traceability to the external metrological device 200 to be verified connected to the first external connection interface 7, i.e., the local quantity transfer/traceability component 2 performs quantity transfer/traceability as a high-grade metrological standard of the external metrological device 200 to be verified. In another case, when the quantity value transfer/traceability module 2 of the measuring instrument is the same source category device or the same meter category device (i.e., both are of the same type) as the external measuring instrument to be verified, the central processing component 1 makes the first selector switch 61 and the second selector switch 62 change to the connection shown in FIG. 2c by means of two control signals of A and B. The a end of the first selector switch 61 is connected to the c end, and the f end of the second selector switch 62 is connected to d end, thereby making the remote quantity value transfer/traceability component 3 connect to the first external connection interface 7, and the external metrological device connected to the first external connection interface 7 can perform quantity value transfer/traceability through the remote quantity value transfer/traceability component 3.

Figure 3:
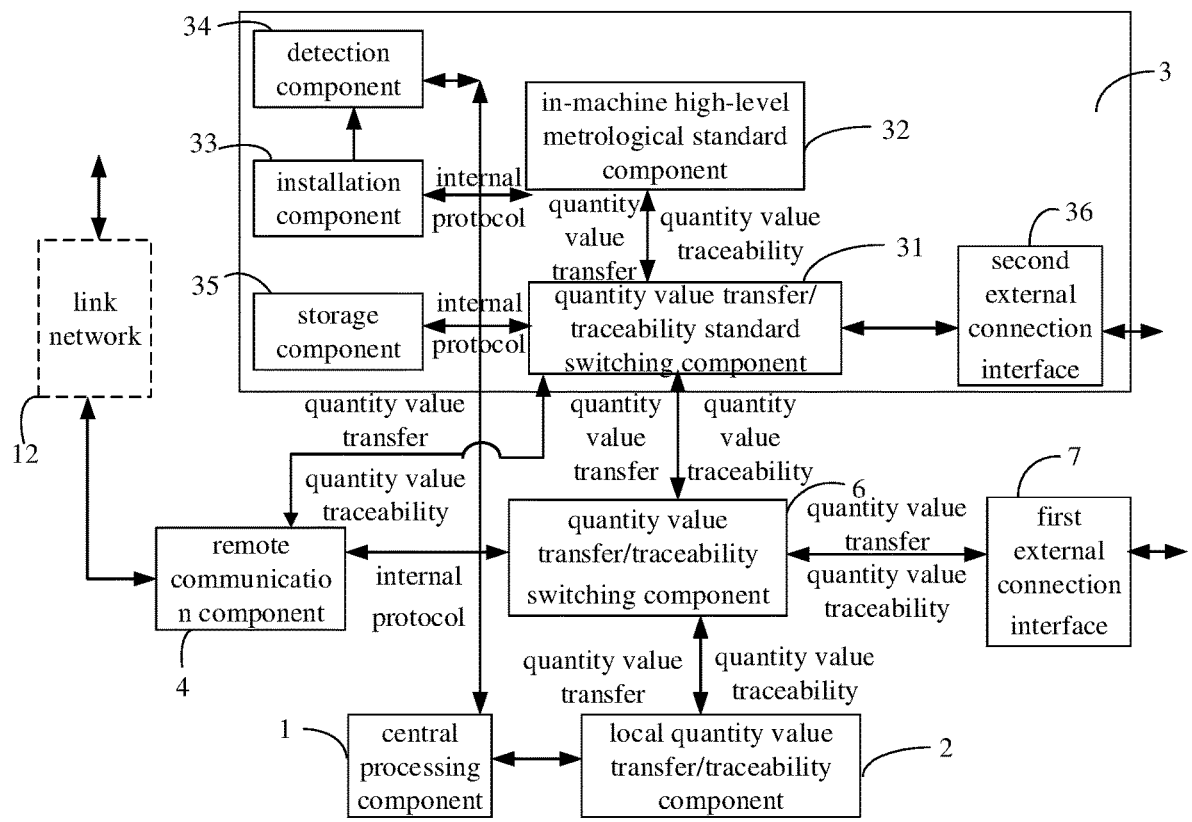
FIG. 3 is a schematic structural view of a measuring instrument according to another embodiment of the disclosure.

Referring to FIG. 3, in a further embodiment, the remote quantity value transfer/traceability component 3 includes an in-machine high-grade metrological standard component 32 and a quantity value transfer/traceability standard switching component 31. The quantity value transfer/traceability standard switching component 31 is connected with the in-machine high-grade metrological standard component 32. The quantity value transfer/traceability standard switching component 31 is configured to make the local quantity value transfer/traceability component 2 perform quantity value transfer/traceability through the in-machine high-grade metrological standard component 32, or make the local quantity value transfer/traceability component 32 perform quantity value transfer/traceability according to the remote high-grade metrological standard obtained from the remote communication component 4. When the remote communication component 4 transmits an analog signal, then the quantity value transfer/traceability standard switching component 31 can be connected to the remote communication component 4. When the remote communication component 4 transmits a digital signal, the quantity value transfer/traceability standard switching component 31 is simply connected to the central processing component 1. The manifestation of the in-machine high-grade metrological standard component 32 may be a physical gauge, circuit, chip, software program module, etc. In some embodiments, the quantity value transfer/traceability standard switching component 31 can be connected to the quantity value transfer/traceability switching component 6, and in other embodiments where the measuring instrument is not provided with a quantity value transfer/traceability switching component 6, the quantity value transfer/traceability standard switching component 31 can be directly connected to the local quantity value transfer/traceability component 2. The in-machine high-grade metrological standard component 32 and the quantity transfer/traceability standard switching assembly 31 can also be connected to the central processing component 1, the central processing component 1 controls the internal components of the remote quantity value transfer/traceability component 3 such as the in-machine high-grade metrological standard component 32 and the quantity value transfer/traceability standard switching component 31 through an internal protocol. It should be noted that in some other embodiments, the remote quantity value transfer/traceability component 3 can also provide a remote quantity value transfer/traceability processing component (not shown in the figure), the remote quantity value transfer/traceability processing component may be a central processing unit (CPU) or a microcontroller unit (MCU), etc., which acts as a central processor inside the remote quantity value transfer/traceability component 3. On the one hand, the remote quantity value transfer/traceability processing component is connected to the central processing component 1, and on the other hand, the remote quantity value transfer/traceability processing component is connected to the internal components of the remote quantity value transfer/traceability component 3 such as the in-machine high-grade metrological standard component 32 and the quantity value transfer/traceability standard switching component 31, it can reduce the data processing volume of the central processing component 1 through controlling the internal components such as the in-machine high-grade metrological standard component 32 and the quantity value transfer/traceability standard switching component 31 using the internal protocols.

When the local quantity value transfer/traceability component 2 is the meter category component, the in-machine high-grade metrological standard component 32 can be configured to the physical measuring tool or its equivalent, such as the in-machine high-grade standard source, the in-machine high-grade standard measuring tool or measuring tool group that its indication stability is greater than that of the local quantity value transfer/traceability component 2, performs quantity value transfer/traceability to the basic measured parameters of the local quantity value transfer/traceability component 2. For example, the in-machine high-grade metrological standard component 32 for the length measuring instrument is a gauge block or its equivalent substance, which takes the output standard length as its most important or most basic technical parameter, the in-machine high-grade metrological standard component 32 for the digital voltmeter is the standard voltage source or its equivalent material with the output voltage value as its most important or most basic technical parameter.

When local quantity value transfer/traceability component 2 is a source category component, the in-machine high-grade metrological standard components can be configured to the in-machine high-grade standard meter, the in-machine high-grade standard measuring instrument or its equivalent module (circuit), which the indication stability is greater than that of the local quantity value transfer/traceability component 2, and configured to perform quantity value transfer/traceability to the basic measured parameters of the local quantity value transfer/traceability component 2. For example, the in-machine high-grade metrological standard component 32 for the signal generator of the output voltage is a high-grade standard voltmeter or its equivalent circuit for measuring the voltage value, the in-machine high-grade metrological standard component 32 for the crystal oscillator that outputs the frequency signal is a high-grade general-purpose counter or frequency meter that measures the frequency value.

In a further embodiment, the in-machine high-grade metrological standard component 32 is configured to at least provide at least one of high-grade metrological standards of a "zero" value, a "full scale" value and a "median" value in a measurement range of the local quantity value transfer/traceability component 2. In order to better assess the linearity and stability of the measuring instruments, the number of measurement points of the in-machine high-grade metrological standard component 32 as a standard signal source output signal is generally not less than three, or the number of standard measuring tools to be equipped as a standard measuring tool group is generally not less than three, and the value range of the measurement points generally includes the "zero" value, the "full scale" value and the "median" value corresponding to a measurement range of the local quantity value transfer/traceability component 2, etc., until finally meeting the requirements of the national metrological verification regulations or calibration specifications for the corresponding measuring points of measuring instruments. Of course, the in-machine high-grade metrological standard component 32 can also provide one or two of the high-grade metrological standards of the "zero" value, "full scale" value, and "median" value in the local measurement range of the local quantity value transfer/traceability component 2.

Please refer to FIG. 4a to FIG. 4d, the quantity value transfer/traceability standard switching component 31 can include the third selector switch 311 and the fourth selector switch 312, the third selector switch 311 and the fourth selector switch 312 can be "two select one" switch, the central processing component 1 can be control third selector switch 311 and the fourth selector switch 312 through two control signals of C and D. In some further embodiments, the h public end of the third selector switch 311 is connected with the in-machine high-grade metrological standard component 32, the k public end of the fourth selector switch 312 is connected with the quantity value transfer/traceability switching component 6, the g end of the third selector switch 311 is connected to the j end of the fourth selector switch 312. The j end of the fourth selector switch 312 is also connected to the remote communication component 4. In other further embodiments, the measuring instrument does not set the quantity value transfer/traceability switching component 6, then the quantity value transfer/traceability standard switching component 31 is directly connected with the local quantity value transfer/traceability component 2, at which point the k common end of the fourth selector switch 312 is directly connected with the local quantity value transfer/traceability component 2.

In the remote quantity value transfer/traceability mode, the quantity value transfer/traceability standard switching component 31 can perform quantity value transfer/traceability to local quantity value transfer/traceability component 2 by choosing to use the in-machine high-grade metrological standard component 32. Please refer to FIG. 4b, the central processing component 1 makes the h end of the third selector switch 311 connect the i end of the third selector switch 311 and the k end of the fourth selector switch 312 connect the m end of the fourth selector switch 312 through the two control signals of C and D, thus making the local quantity value transfer/traceability 2 connect to the in-machine high-grade metrological standard component 32 through quantity value transfer/traceability switching component 6 and the quantity value transfer/traceability standard switching component 31, and disconnect from the remote communication component 4. The remote quantity value transfer/traceability component 3 performs quantity value transfer/traceability to local quantity value transfer/traceability component 2 through the in-machine high-grade metrological standard component 32. In remote quantity value transfer/traceability mode, the quantity value transfer/traceability standard switching component 31 can also choose to use the remote communication component 4 to perform quantity value transfer/traceability for the local quantity value transfer/traceability component 2. Please refer to FIG. 4a, the central processing component 1 makes the h end of the third selector switch 311 connect to the i end of the third selector switch 311, and the k end of the fourth selector switch 312 connect to the j end of the fourth selector switch 312 through two control signals of C and D, thus making the local quantity value transfer/traceability component 2 connect to the remote communication component 4 through the quantity value transfer/traceability switching component 6 and the quantity value transfer/traceability standard switching component 31 and disconnected from the in-machine high-grade metrological standard component 32. The remote quantity value transfer/traceability component 3 is connected to the remote device through the remote communication component 4 and the link network 12 to obtain the remote high-grade metrological standards. The remote high-grade metrological standards are used to perform quantity value transfer/traceability to the local quantity value transfer/traceability component 2 by the remote quantity value transfer/traceability component 3.

In other further embodiments, the quantity value transfer/traceability standard switching component 31 can perform quantity value transfer/traceability to the in-machine high-grade metrological standard component 32 by choosing to use the remote communication component 4. Please refer to FIG. 4d, the central processing component 1 makes the h end of the third selector switch 311 connect to the g end of the third selector switch 311 and the k end of the fourth selector switch 312 connect to the m end of the fourth selector switch 312 through the two control signals of C and D, thus making the in-machine high-grade metrological standard component 32 connect to the remote communication component 4 through the quantity value transfer/traceability standard switching component 31, the local quantity value transfer/traceability component 2 is disconnected from the in-machine high-grade metrological standard component 32 and the remote communication component 4, the remote quantity value transfer/traceability component 3 is connected to the remote device through the remote communication component 4 and the link network 12 to obtain the remote high-grade metrological standard, and the remote quantity value transfer/traceability component 3 performs quantity value transfer/traceability to the in-machine high-grade metrological standard component 32 by using the remote high-grade metrological standard.

Figure 4A:
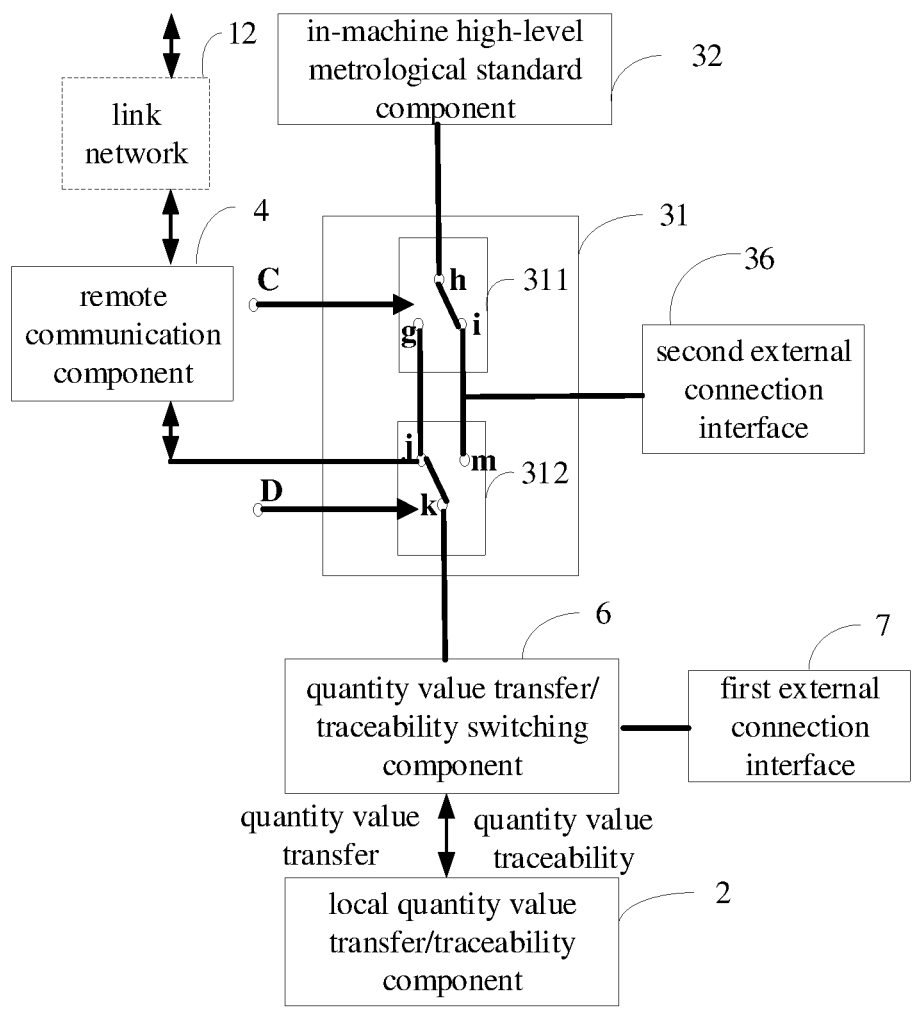
FIG. 4a is a schematic view of a connection of a quantity value transfer/traceability standard switching component of FIG. 3 in a quantity value transfer/traceability mode.
Figure 4B:
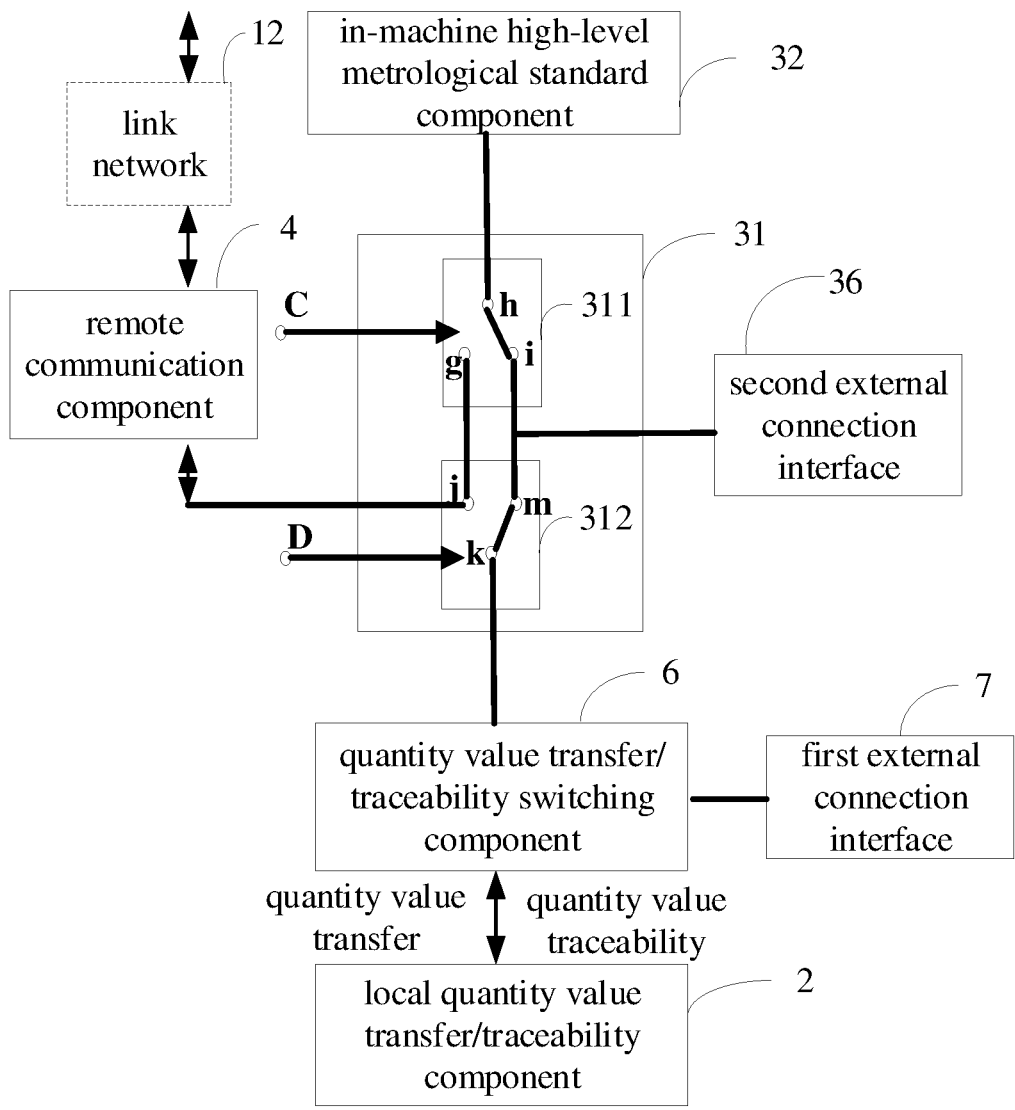
FIG. 4b is a schematic view of a connection of the quantity value transfer/traceability standard switching component of FIG. 3 in another quantity value transfer/traceability mode.

In the above intermediate quantity value transfer/traceability mode, when the central processing component 1 performs quantity value transfer/traceability to the external metrological device 200 connected to the first external connection interface 7, the central processing component 1 can performs quantity value transfer/traceability to the external metrological device 200 by choosing the in-machine high-grade metrological standard component 32 according to the needs, at this time, the connection status of the quantity value transfer/traceability standard switching component 31 as shown in FIG. 4b, the central processing component 1 can choose to use the remote communication component 4 and the link network 12 to connect to the remote device to obtain the remote high-grade metrological standard. the central processing component 1 performs quantity value transfer/traceability to the external metrological device 200 connected to the first external connection interface 7 by using this remote high-grade metrological standard, at this time the connection status of the quantity value transfer/traceability standard switching component 31 as shown in FIG. 4a.

Figure 4C:
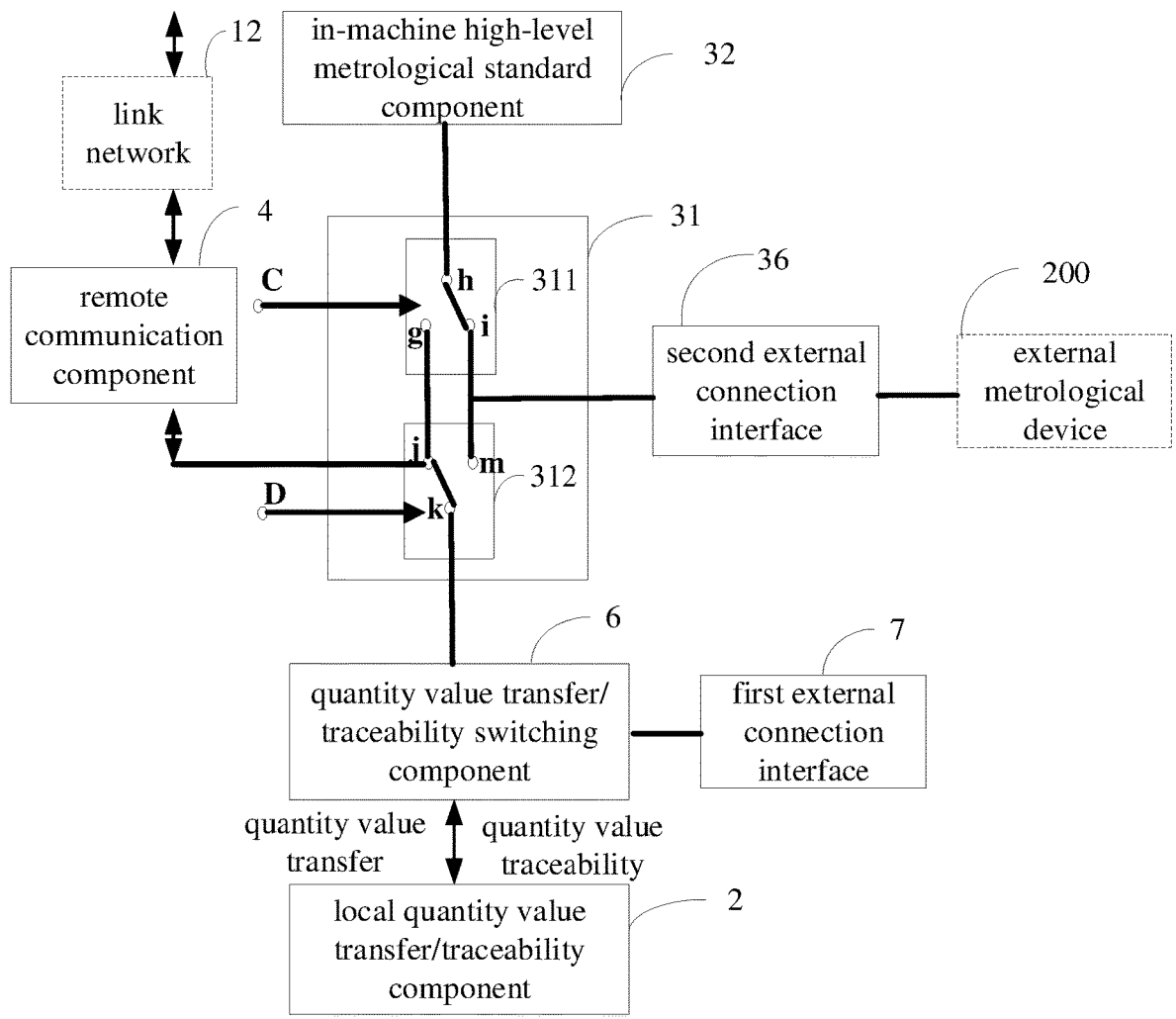
FIG. 4c is a schematic view of a connection of the quantity value transfer/traceability standard switching component of FIG. 3 in further another quantity value transfer/traceability mode.
Figure 4D:
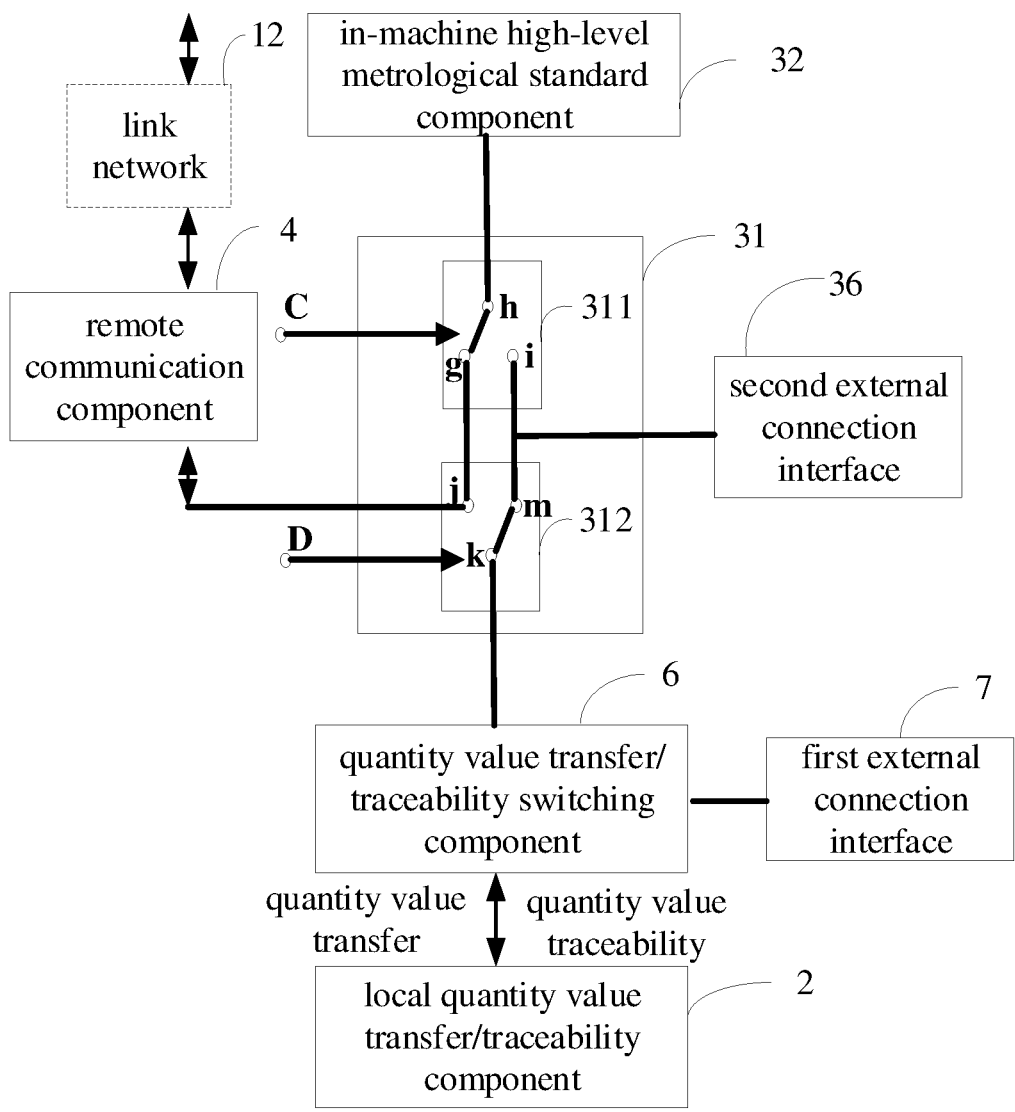
FIG. 4d is a schematic view of a connection of the quantity value transfer/traceability standard switching component of FIG. 3 in further another quantity value transfer/traceability mode.

In a further embodiment, the remote quantity value transfer/traceability component 3 includes a second external connection interface 36, the second external connection interface 36 is connected with the quantity value transfer/traceability standard switching component 31, and is matched with the in-machine high-grade metrological standard component 32, which can be used for the input and/or output interface, configured to connect the remote quantity value transfer/traceability component 3 to the external metrological device 200. Refer to FIG. 4c, in some further embodiments, when the second external connection interface 36 is connected to the external metrological device 200, and the external metrological device 200 and the in-machine high-grade metrological standard component 32 are mutually "source equipment/components", "instrument equipment/components", that is, one of the external metrological device 200 and the in-machine high-grade metrological standard component 32 is the meter category, the other one is the source category. The central processing component 1 can make the h end of the third selector switch 311 connect to the i end of the third selector switch 311 and the k end of the fourth selector switch 312 connect to the j end of the fourth selector switch 312 through two control signals of C and D, thus making the in-machine high-grade metrological standard component 32 connect to the second external connection interface 36, and perform quantity value transfer/traceability to the external metrological device 200 connected to the second external connection interface 36. When the metrological grade of the external metrological device 200 is greater than that of the in-machine high-grade metrological standard component 32, the external metrological device 200 is used as the high-grade metrological standard, the external metrological device 200 perform quantity value transfer/traceability to the in-machine high-grade metrological standard component 32; on the contrary, when the metrological grade of the external metrological device 200 is less than that of the in-machine high-grade metrological standard component 32, the in-machine high-grade metrological standard component 32 is used as the high-grade metrological standard, the in-machine high-grade metrological standard component 32 perform quantity value transfer/traceability to the external metrological device 200.

Please refer to FIG. 3, in a further embodiment, the remote quantity value transfer/traceability component 3 further includes an installation component 33 and a detection component 34. The in-machine high-grade metrological standard component 32 is detachably connected with the installation component 33, the detection component 34 is connected with the installation component 33, configured to detect whether the in-machine high-grade metrological standard component 32 is connected with the installation component 33, and send a detection result to the central processing component 1. Due to the detachable connection of the in-machine high-grade metrological standard component 32 and the installation component 33, so the above physical measuring tools or their equivalents, analog substances/modules/circuits or standard meters, measuring instruments, etc. can all be taken out of the measuring instrument and used as a "transmission standard" or "blind sample comparison" for examination, verification, comparison, calibration, adjustment or replacement, etc. In order to facilitate the loading and unloading of the in-machine high-grade metrological standard component 32, the installation component 33 can have positioning, fixing devices, clamps, and even loading and unloading driving equipment. For example, the installation component 33 can be the chip slots, the weight installation and the drive equipment. The detection component 34 can timely and accurately detect or sense whether the installation component 33 has been installed in the in-machine high-grade metrological standard component 32, and even can detect the category of the installed in-machine high-grade metrological standard component 32, whether the use state of the in-machine high-grade metrological standard component 32 in use is good and effective, and generate the corresponding signal sent to the central processing component 1. Under the guidance of the human-machine dialogue component 5, the instruction manual or the measuring device body in some suitable position, no machine needs to be dismantled, the main loading and unloading operation can basically be easily completed by the metering instrument itself or automatically or with the assistance of human, easy to use direct measurement or comparative measurement method to achieve local quantity value transfer/traceability.

In other embodiments, the in-machine high-grade metrological standard component 32 does not need to be removed from the remote quantity value transfer/traceability component 3, at this time the in-machine high-grade metrological standard component 32 can be fixed inside the measuring instrument, and at least the following two modes: first, the commercially available products with fixed fixture long-term positioning and fixed in a suitable position within the measuring instrument and prohibited self-loading, such as the ceramic measuring block or its equivalent positioning and fixation in the length gauge; second, the function module or circuit of the in-machine high-grade metrological standard component 32 is designed as part of the measuring instrument into the whole measuring instrument, for example, the high-grade standard resistor, capacitor, inductor or its equivalent circuit is designed into the LCR digital bridge as an in-machine high-grade metrological standard of "in-verification" and "self-examination". At this point, the in-machine high-grade metrological standard 32 and the measuring instrument form an organic whole that cannot be removed from the measuring instrument.

In a further embodiment, the remote quantity value transfer/traceability component 3 also includes a storage component 35, the quantity value transfer/traceability standard switching component 31 is connected to the storage component 35. The storage component 35 can be RAM (Random Access Memory), ROM (Read-Only Memory), EPROM (Electrical Programmable Read Only Memory), EEPROM (Electrically Erasable Programmable read only memory), FLASH, disk, optical and other storage devices. The storage component 35 is used to store at least one of the following data: the in-machine high-grade metrological standard component 32 performed quantity value transfer/traceability data, the local quantity value transfer/traceability component 2 through the remote quantity value transfer/traceability component 3 performed quantity value transfer/traceability data, the external metrological device 200 through the remote quantity value transfer/traceability component 3 performed quantity value transfer/traceability data. The in-machine high-grade metrological standard component 32 performed quantity value transfer/traceability data includes the data performed the remote quantity value transfer/traceability to the in-machine high-grade metrological standard component 32 by the remote communication component 4, and the local quantity value transfer/traceability data completed by the in-machine high-grade metrological standard component 32 as the "transmission standard" to take out the external inspection (calibration)/comparison etc., and the data performed quantity value transfer/traceability data of the in-machine high-grade metrological standard component 32 by the external metrological device 200 connected with the second external connection interface 36. The local quantity value transfer/traceability component 2 through the remote quantity value transfer/traceability component 3 performed quantity value transfer/traceability data includes the data performed the remote quantity value transfer/traceability to the local quantity value transfer/traceability component 2 by the in-machine high-grade metrological standard component 32, the data performed the remote quantity value transfer/traceability to the local quantity value transfer/traceability component 2 by the remote communication component 4, and etc. The external metrological device 200 through the remote quantity value transfer/traceability component 3 performed quantity value transfer/traceability data includes the data performed quantity value transfer/traceability to the external device 200 by the in-machine high-grade metrological standard component 32, the data performed quantity value transfer/traceability to the external device 200 by the module communication module 4, etc. The storage component 35 can also store quantity value transfer/traceability data of the local quantity value transfer/traceability component 2 when working normally, the data performed quantity value transfer/traceability to the external metrological device by the local quantity value transfer/traceability component 2, etc. These quantity value transfer/traceability data may can include quantity value transfer or traceability data/results during a valid verification cycle or calibration interval, local or remote categories, quantity value transfer or traceability categories/times, quantity value transfer or traceability unit names and locations, high-grade standard source or instrument identification, etc. These data are generally retained for 5 years or more.

In a further embodiment, the measuring instrument also includes a positioning component (not shown in figure) and/or a local communication component 8 and/or an internal storage component 9 and/or a self-examination/calibration (also referred as self-examination and calibration) component 11, i.e., that is the measuring instruments include one or more of the positioning component, the local communication component 8, the internal storage component 9 and the self-examination/calibration component 11. The positioning component, the local communication component 8, the internal storage component 9 and the self-examination/calibration component 11 are all connected to the central processing component 1, the central processing component 1 controls the positioning component, the local communication component 8, the internal storage component 9 and the self-examination/calibration component 11 through the internal protocols.

The positioning component is used to position the measuring instruments and transmit the positioning signal through the remote communication component 4 and the link network 12. In some embodiments, the positioning component and the remote communication component 4 can be integrated into the same chip. The positioning component currently include two main categories: the base station positioning component for the mobile communication and the GNSS positioning component, whose main roles are, firstly, to determine the geographic location of the measuring sensors installed in the measuring instrument and, secondly, to provide information services related to the location. The base station positioning includes LBS (Location Based Service) positioning or MPS positioning (Mobile Position Services), which is convenient and low cost, and as long as the signal difference of the signals received from three base stations is calculated, the location of the measuring instrument or equipment can be determined, without being affected by weather, tall buildings, indoor locations, etc. However, the base station positioning cannot be accurately positioned at a location without a base station, so there is a blind spot in the base station positioning. GNSS positioning is Global Navigation Satellite System positioning, and the existing positioning systems are GPS, BeiDou, GLONASS, Galileo, etc., whose positioning is accurate without blind spots, and the positioning information is easy to be adopted by other systems, but the GNSS positioning accuracy is easily affected by factors such as weather, signal obscuration, and indoor location. GNSS positioning and LBS positioning (or MPS positioning) can be mutually compatible and complementary.

The internal storage component 9 can be RAM, ROM, EPROM, EEPROM, FLASH, disk, CD-ROM and other storage devices. The internal storage component 9 can store the parameters and algorithms, etc. that need to be modified and corrected after the examination, self-examination, self-calibration, verification, calibration, etc., so that it is convenient for the subsequent program to be called at any time, and it can also store the metrological data generated by the local quantity value transfer/traceability component 2 during normal operation and the data performed quantity value transfer/traceability to the external metrological device 200 by the local quantity value transfer/traceability component 2,etc.

The local communication component 8 is used for local proximity communication of the measuring instrument, the main difference with the remote communication component 4 is that it can transmit signals with another local external metrological device 200 without the link network 12. The local communication component 8 can be the external communication interface and protocol components for external communication between the measuring instrument and the calibrated (verdict) external metrological instrument 200 through the link bus, or it can be the components for communication using IR (infrared) or short-range wireless communication technology.

The link bus generally includes but is not limited to three types of buses, such as the chip bus (C-Bus), the internal bus (I-Bus), and the external bus (E-Bus). Among them: the chip bus, also known as the component-level bus, is the information transmission path that links various different chips together to form specific functional modules (such as CPU modules) and execute internal (communication) protocols. The internal bus also known as system bus or board-level bus, is the information transmission path between the plug-ins (modules) in the measuring apparatus system (such as the transmission path between CPU modules and memory modules or I/O modules), which generally suitable for the link between two or more chips or modules inside the product. The external bus also known as the communication bus, is an information transmission path between various systems of the measuring instruments or between the measuring instrument systems and sensors, other instruments with microcomputer systems, and measuring control devices, generally suitable for the link between two or more products in close proximity to the site. The bus generally includes three different functions of the bus: the data bus (DB), the address bus (AB), the control bus (CB). The link bus of the local communication component 8 referred to here is generally the external bus.

With the development of the integrated circuit technology and the increasing integration of the integrated circuit chips, the difference between the chip bus and the internal bus, or even the external bus has become more and more blurred and difficult to distinguish. Generally speaking, SPI (Serial Peripheral Interface), IIC (Inter-Integrated Circuit) bus, etc. are called the chip bus. FSB (Front Side BUS), HT (Hyper Transport), QPI (Quick Path Interconnect), IIC, SPI, SCI (serial communication interface) bus, etc. are called the internal bus. VESA (video electronics standard association), DB (Data Bus)/CB (Control Bus)/AB (Address Bus), IBM PC, ISA (Industry Standard Architecture), EISA (Extended Industry Standard Architecture), PCI (Peripheral Component Interconnect), IIC, MCA (MicroChannel Architecture), STD (Standard Data Bus), VME (VersaModule Eurocard), PC/104, Compact PCI, PCI-E, etc. are called the system buses. RS-232C/422A/423A/485, GPIB (General-Purpose Interface Bus) or IEEE-488, M-Bus, VXI-A/B/C/D or IEEE-1155, SPI, PXI/PCI, SCSI, IDE, Centronics, USB, IEEE-1394B, CAN, and other buses are called the external buses. In addition, people also use FF, Lonworks, Profibus, CAN, HART and other buses for solving the communication between field sensors, instruments and devices or between field instruments and devices and advanced background management systems collectively as fieldbus, etc.

The link bus only provides a channel for data or information transmission, and the data or information should be reliably transmitted by the corresponding bus protocols or standards, such as Modbus, 100 BaseT, USB2.0 and other bus protocols. Commonly used bus interfaces and protocols include GPIB (IEEE488, etc.) interfaces and protocols, COM interfaces (RS-232/RS-485, etc.) and protocols, USB interfaces (USB2.0, etc.) and protocols, etc.

The self-examination and calibration component 11 are used for real-time correction/monitoring of the operation of the measuring instrument to ensure the normal operation of the measuring instrument and the accuracy and reliability of the displayed value. The correction of the simple or key parameters of the measuring instrument according to the manufacturer's set procedures or processes is called calibration, automatically completed the above process is called self-calibration, power on automatically according to the set procedures or processes to complete the routine normal check of their key functional components is called self-examination. The process of setting the feedback function circuit and program in the machine and informing the operator of the actual measurement results and feedback information through sound, light or display circuit or program at any time is called monitoring-measuring, and the process of compensating or correcting the monitored object to make it normal according to the monitoring data or results is called monitoring-controlling. The above processes of self-examination, calibration, self-calibration, monitoring-measuring and monitoring-controlling include both hardware and software and process procedures.

In a further embodiment, the measuring instrument also includes an environmental parameter detection module 10. The environmental parameter detection module 10 is connected to the central processing component 1, and the central processing component 1 is used to adjust the output of the local quantity value transfer/traceability component 2 according to the detection results of the environmental parameter detection component 10, such as temperature compensation, etc. The environmental parameter detection component 10 samples parameters or factors whose values are influenced by environmental conditions, and the sampled data is either processed by itself or handed over to the central processing component 1 for processing, in order to eliminate the influence of environmental factors on the displayed values of the measuring instruments. Different types of the measuring instruments are configured with different types of the environmental parameter detection components 10, such as the length measuring instruments are greatly affected by temperature, so configured of the temperature sampler or sensor; the scale measuring instruments are greatly affected by environmental vibration, so configured of the vibration sampler or sensor; the electromagnetic measuring instruments are greatly affected by environmental electromagnetic interference, so configured of the environmental electromagnetic interference sampler or sensor; the halogen leak detector must eliminate the impact of environmental noise, so the instrument needs to be configured in addition to the detection of halogen gas leakage sampler or sensor, but also needs to be configured to detect the environment has been left behind in the halogen gas sampler or sensor.

The measuring instruments provided by the embodiment of the disclosure can either performing quantity value transfer/traceability to the local quantity value transfer/traceability component through the in-machine high-grade metrological standard or obtaining the remote high-grade metrological standard through the remote communication component and performing quantity value transfer/traceability to the local quantity value transfer/traceability component by using the remote high-grade metrological standard, which makes the quantity value transfer/traceability of the measuring instrument very convenient and simple.

In an embodiment of the disclosure, the measuring instruments can also be performed quantity value transfer/traceability in other ways.

In an embodiment, the measuring instrument includes the local quantity value transfer/traceability component 2, the in-machine high-grade metrological standard component 32 and the remote communication component 4; the local quantity value transfer/traceability component 2, the in-machine high-grade metrological standard component 32 and the remote communication component 4 are all connected to the central processing component 1. The local quantity value transfer/traceability component 2 is the source category component, the in-machine high-grade metrological standard component 32 is the meter category component. A metrological grade of the in-machine high-grade metrological standard component 32 is greater than or equal to that of the local quantity value transfer/traceability component 2.

the method of remote quantity value transfer/traceability includes:

performing metrological operation (also referred as performing measurement) to one of the local quantity value transfer/traceability component 2 and the measuring instrument to be detected (also referred as the measuring instrument to be measured) from external connected with a measuring instrument by using the in-machine high-grade metrological standard component 32, and thereby to obtain a first metrological result, and the measuring instrument to be detected from external is the source category component;

obtaining a remote metrological standard signal from the remote communication component 4, and performing metrological operation to the remote metrological standard signal by using the in-machine high-grade metrological standard component 32 to obtain a second metrological result; this step can be performed by disconnecting the in-machine high-grade metrological standard component 32 from the local quantity value transfer/traceability component 2 or the measuring instrument to be detected from external.

obtaining a quantity value transfer/traceability result of the one of the local quantity value transfer/traceability component 2 and the measuring instrument to be detected from external by comparing the first metrological result and the second metrological result. Specifically, the data difference between the first metrological result and the second metrological result is calculated to obtain the indicated value error of one of the local quantity value transfer/traceability component 2 and the measuring instrument to be detected from external, where the indicated value error of the quantity value transfer/traceability module 2 is also the indicated value error of the measuring instrument.

It should be noted that, when the measuring instrument to be detected from external is to be performed quantity value transfer/traceability, the in-machine high-grade metrological standard component 32 is used to perform metrological operation to the measuring instrument to be detected from external to obtain the first metrological result, and the obtained quantity value transfer/traceability result is also the quantity value transfer/traceability result of the measuring instrument to be detected from external. When the measuring instrument itself is to be performed quantity value transfer/traceability, the in-machine high-grade metrological standard component 32 is used to perform metrological operation to the local quantity value transfer/traceability component 2, thereby obtain the first metrological result, and the obtained quantity value transfer/traceability result is also the quantity value transfer/traceability result of the measuring instrument.

In a preferred embodiment, the measuring instrument has an intermediary mode, when the measuring instrument to be detected from external is the source category component and connected with the measuring instrument of the intermediary mode, the measuring instrument can be used to perform quantity value transfer/traceability to the measuring instrument to be detected from external. That is, in the intermediary mode, if the measuring instrument is connected to the measuring instrument to be detected from external that is the source category component, the metrological operation of the measuring instrument to be detected from external can be performed by the in-machine high-grade metrological standard component 32 to obtain the first metrological result, and the obtained quantity value transfer/traceability result is also the quantity value transfer/traceability result of the measuring instrument to be detected from external. In the non-intermediated mode, or the connected measuring instrument to be detected from external is the meter category component, the local quantity value transfer/traceability component 2 can be performed metrological operation by the in-machine high-grade metrological standard component 32 to obtain the first metrological result.

As described in the above embodiment, in addition to the remote quantity value transfer/traceability method described above, the quantity value transfer/traceability can also be performed in the mode of local quantity value transfer/traceability: performing metrological operation to one of the local quantity value transfer/traceability component 2 and the measuring instrument to be detected from external by using the in-machine high-grade metrological standard component 32, and thereby to obtain a third metrological result; and obtaining the quantity value transfer/traceability result of the one of the local quantity value transfer/traceability component 2 and the measuring instrument to be detected from external according to the third metrological result. In other words, the quantity value transfer/traceability of the one of the local quantity value transfer/traceability component 2 and the measuring instrument to be detected from external is directly performed by using the in-machine high-grade metrological standard component 32.

Corresponding to the above embodiments, in some other embodiments, a measuring instrument includes a local quantity value transfer/traceability component 2, an in-machine high-grade metrological standard component 32 and a remote communication component 4. The local quantity value transfer/traceability component 2, the in-machine high-grade metrological standard component 32 and the remote communication component 4 are all connected to the central processing component 1. The local quantity value transfer/traceability component 2 is the meter category component, the in-machine high-grade metrological standard component 32 is the source category component, the metrological grade of the in-machine high-grade metrological standard component 32 is greater than or equal to that of the local quantity value transfer/traceability component 2.

The method of quantity value transfer/traceability includes:
performing metrological operation to the in-machine high-grade metrological standard component 32 by using one of the local quantity value transfer/traceability component 2 and a measuring instrument to be detected from external connected with the measuring instrument to obtain a fourth metrological result;
obtaining a remote metrological standard signal from the remote communication component 4, and performing metrological operation to the remote metrological standard signal by using the one of the local quantity value transfer/traceability component 2 and the measuring instrument to be detected from external connected with the measuring instrument to obtain a fifth metrological result;
obtaining a quantity value transfer/traceability result of the in-machine high-grade metrological standard component 32 by comparing the fourth metrological result and the fifth metrological result. Specifically, the data difference between the fourth metrological result and the fifth metrological result is calculated to obtain the indicated value error of the in-machine high-grade metrological standard component 32. By performing the quantity value transfer/traceability of the in-machine high-grade metrological standard component 32, it can be determined whether the indicated value error of the in-machine high-grade metrological standard component 32 is stable and whether the in-machine high-grade metrological standard component 32 can be used for the quantity value transfer/traceability of the local quantity value transfer/traceability component 2 or the measuring instrument to be detected from external. If after a certain period of time, the indicated value error of the in-machine high-grade metrological standard component 32 becomes larger to a certain extent, the in-machine high-grade metrological standard component 32 should be replaced.

In a further embodiment, when the measuring instrument is connected to an external metrological device 200 through one of the first external connection interface 7 and the second external connection interface 36, the external metrological device 200 performs quantity value transfer/traceability to the in-machine high-grade metrological standard component 32, when the external metrological device 200 is the meter category component and a metrological grade of the external metrological device 200 is greater than that of the in-machine high-grade metrological standard component 32, and thus determining whether in-machine high-grade metrological standard component 32 is qualified and can be used to perform quantity value transfer/traceability to one of the local quantity value transfer/traceability component 2 and the measuring instrument to be detected from external. Or, the in-machine high-grade metrological standard component 32 performs quantity value transfer/traceability to the external metrological device 200 when the external metrological device 200 is the meter category component and a metrological grade of the external metrological device 200 is less than that of the in-machine high-grade metrological standard component 32, that is, a way of the intermediate quantity value transfer/traceability mode.

As described in the above embodiment, in addition to the above remote quantity value transfer/traceability method, the quantity value transfer/traceability can also be performed in the mode of the local quantity value transfer/traceability: performing metrological operation to the in-machine high-grade metrological standard component 32 by using the local quantity value transfer/traceability component 2 to obtain a sixth metrological result; obtaining a quantity value transfer/traceability result of the local quantity value transfer/traceability component according to the sixth metrological result. In other words, the quantity value transfer/traceability of one of the local quantity value transfer/traceability component 2 and the measuring instrument to be detected from external is directly performed by using the in-machine high-grade metrological standard component 32.

In some embodiments, a measuring instrument includes the local quantity value transfer/traceability component 2, the in-machine high-grade metrological standard component 32 and the remote communication component 4, the local quantity value transfer/traceability component 2, the in-machine high-grade metrological standard component 32 and the remote communication component 4 are all connected to the central processing component 1. The local quantity value transfer/traceability component 2 is the meter category component, the in-machine high-grade metrological standard component 32 is the source category component. The metrological grade of the in-machine high-grade metrological standard component 32 is greater than or equal to the local quantity value transfer/traceability component 2.

the method of remote quantity value transfer/traceability includes:
performing metrological operation to the in-machine high-grade metrological standard component 32 by using local quantity value transfer/traceability component 2 to obtain a seventh metrological result;
sending a remote metrological standard signal to a remote measuring instrument through the remote communication component 4 by the in-machine high-grade metrological standard component 32, the remote measuring instrument performs metrological operation to the remote metrological standard signal to obtain an eighth metrological result; or performing metrological operation to the in-machine high-grade metrological standard component 32 by using a measuring instrument from external connected with the measuring instrument to obtain a ninth metrological result, the measuring instrument from external connected with the measuring instrument is the meter category component, and its metrological grade is greater than the local quantity value transfer/traceability component 2;

obtaining a quantity value transfer/traceability result of the local quantity value transfer/traceability component 2 by comparing the seventh metrological result and the eighth metrological result or comparing the seventh metrological result and the ninth metrological result.

In this embodiment, the metrological result of the local quantity value transfer/traceability component 2 to the in-machine high-grade metrological standard component 32 are compared with the metrological result of a remote measuring instrument or a higher-grade external measuring instrument to the in-machine high-grade metrological standard component 32, to obtain the indicated value error of the local quantity value transfer/traceability component 2, so as to realize the quantity value transfer/traceability of the local quantity value transfer/traceability component 2.

In other embodiment, a measuring instrument includes the local quantity value transfer/traceability component 2, the in-machine high-grade metrological standard component 32 and the remote communication component 4, the local quantity value transfer/traceability component 2, the in-machine high-grade metrological standard component 32 and the remote communication component 4 are all connected to the central processing component 1. The local quantity value transfer/traceability component 2 is the meter category component, the in-machine high-grade metrological standard component 32 is the source category component. The metrological grade of the in-machine high-grade metrological standard component 32 is greater than or equal to that of the local quantity value transfer/traceability component 2.

The method of remote quantity value transfer/traceability includes:

performing metrological operation to the in-machine high-grade metrological standard component by using a measuring instrument to be detected from external connected to the measuring instrument to obtain a tenth metrological result; the measuring instrument to be detected from external is the meter category component;

sending a remote metrological standard signal to a remote measuring instrument through the remote communication component by the in-machine high-grade metrological standard component, the remote measuring instrument performs metrological operation to the remote metrological standard signal to obtain an eleventh metrological result;

obtaining a quantity value transfer/traceability result of the measuring instrument to be detected from external by comparing the tenth metrological result and the eleventh metrological result.

In this embodiment, the quantity value transfer/traceability of the measuring instrument to be detected from external is achieved by comparing the metrological result of the measuring instrument to be detected from external to the in-machine high-grade metrological standard component 32 with the metrological result of the remote measuring instrument to the in-machine high-grade metrological standard component 32 to obtain the indicated value error of the measuring instrument to be detected from external. That is, the measuring instrument is used as an intermediary for quantity value transfer/traceability.

In the above embodiment, the remote measuring instrument may be connected to the remote communication component 4 of the measuring instrument by wireless or wired.

When the in-machine high-grade metrological standard component 32 is the source category component and the local quantity value transfer/traceability component 2 is the meter category component, the in-machine high-grade metrological standard component 32 can include a standard signal generator and a signal modulator. The remote measuring instrument correspondingly includes a signal demodulator. When the quantity value transfer/traceability is started, the standard signal generator generates a remote metrological standard signal corresponding to the measuring instrument, which may be a digital signal or an analog signal. The signal modulator modulates the remote metrological standard signal to improve the anti-interference capability of the signal. The modulation can be amplitude modulation, frequency modulation, phase modulation, etc., which will not be described here. The modulated signal is sent out through the remote communication component 4 by radio waves or wired network. After the remote measuring instrument receives the modulated remote metrological standard signal, the remote metrological standard signal is demodulated by the signal demodulator, and then the demodulated remote metrological standard signal is detected (also referred as performed measurement or performed metrological operation) to obtain the metrological result of the remote metrological standard signal.

The measuring instrument is selected from the group consisting of a voltage measuring instrument, a current measuring instrument, a resistance measuring instrument, a capacitance measuring instrument, an inductance measuring instrument, a temperature measuring instrument, a humidity measuring instrument, a weight measuring instrument, a pressure measuring instrument and a liquid level measuring instrument; the remote high-grade metrological standard correspondingly is selected from the group consisting of a voltage measuring standard, a current measuring standard, a resistance measuring standard, a capacitance measuring standard, an inductance measuring standard, a temperature measuring standard, a humidity measuring standard, a weight measuring standard, a pressure measuring standard and a liquid level measuring standard. The measuring instrument can transmit the signals of the remote high-grade metrological standards selected from the group of voltage measuring standard, current measuring standard, resistance measuring standard, capacitance measuring standard, inductance measuring standard, temperature measuring standard, humidity measuring standard, weight measuring standard, pressure measuring standard and liquid level measuring standard to the remote measuring instrument by means of radio waves or wired networks, and the remote measuring instrument will perform measurement to the signals of the remote high-grade metrological standards and send the measured results to the measuring instrument management system. The measuring instrument management system compares and analyzes the measured results of different steps to obtain the results of quantity value transfer/traceability, so as to realize quantity value transfer/traceability.

For some non-electric quantity measuring instruments (such as pressure gauges, electronic thermometers, etc.), the local quantity transmission/traceability components 2 generally include a sensor (such as pressure sensors, temperature sensors, etc.) and a measurer connected to the sensor, the sensor is configured to detect an object to be detected and generate an electrical signal, the measurer is configured to perform metrological operation to the electrical signal of the sensor thereby obtain a metrological result of the object to be detected. When such the measuring instrument is in a normal working state (first state), the central processing component 1 controls the measurer perform metrological operation to the electrical signal of the sensor, and the metrological result obtained at this time is the metrological result of the measuring instrument on the object to be detected. In the remote quantity value transfer/traceability state (second state), the measurer performs metrological operation to the electrical signal received through remote communication bypassing the sensor, not the electrical signal generated by the sensor.

Correspondingly, when the in-machine high-grade metrological standard component 32 is the meter category component and the local quantity value transfer/traceability component 2 is the source category component, the measurement instrument can include a signal demodulator. When the measuring instrument obtains a remote metrological standard signal from an external device (such as a remote metrological standard signal source) through the remote communication component 4, the signal demodulator is used to demodulate the remote metrological standard signal, and then the in-machine high-grade metrological standard component 32 detects (also referred as performs measurement to or performs metrological operation to) the remote metrological standard signal after demodulation, to obtain the metrological result of the remote metrological standard signal.

Figure 5:
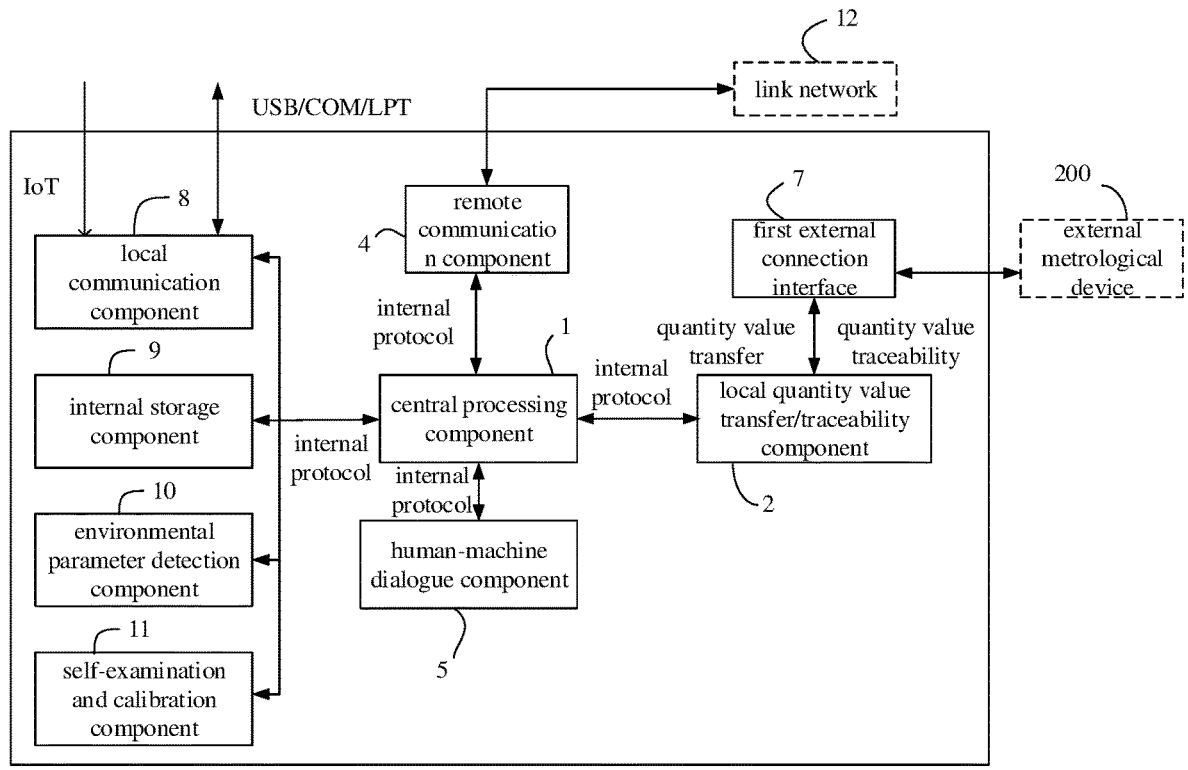
FIG. 5 is a schematic structural view of a measuring instrument according to further another embodiment of the disclosure.
Figure 6:
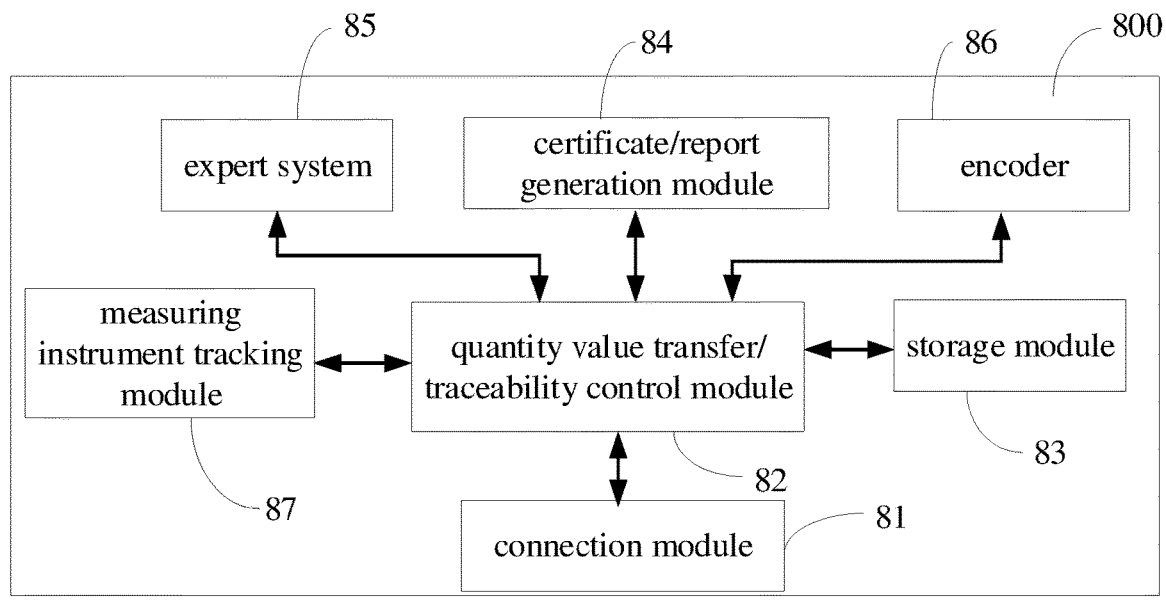
FIG. 6 is a schematic structural view of a measuring instrument management system according to an embodiment of the disclosure.
Figure 7:
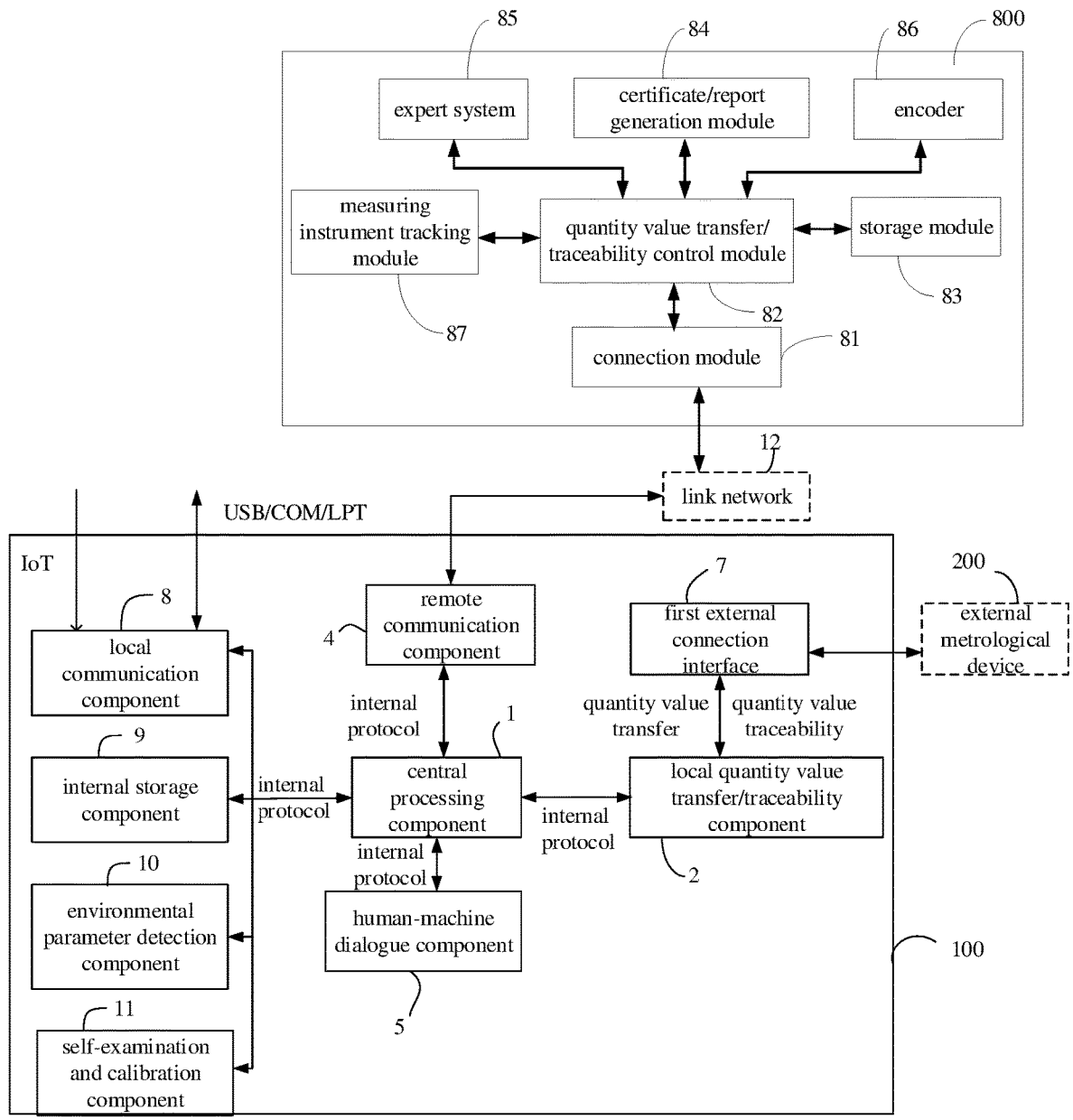
FIG. 7 is a schematic view of a connection between the measuring instrument management system and the measuring instrument of FIG. 6.
Figure 8:
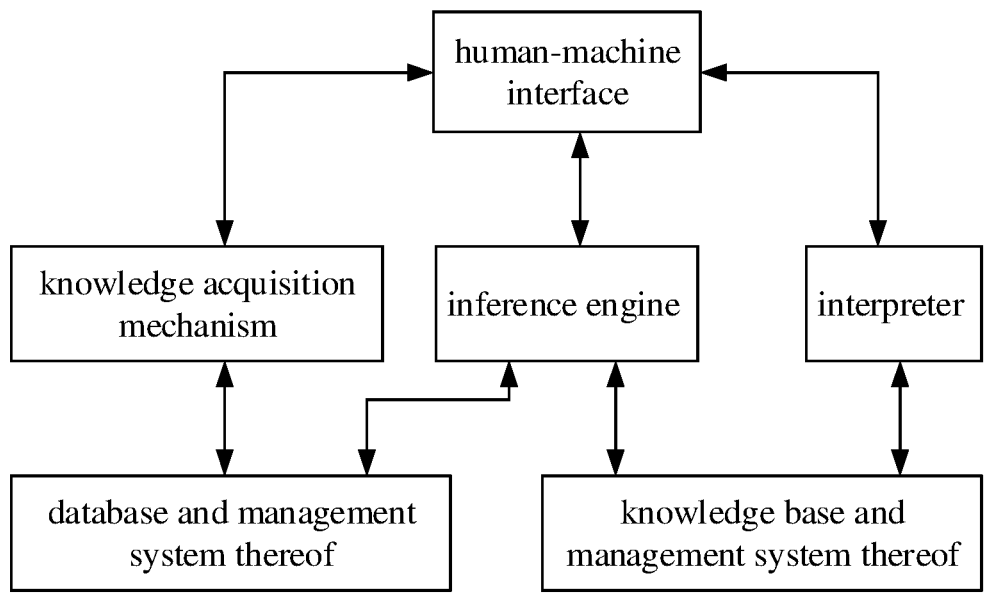
FIG. 8 is a schematic structural view of an expert system of the measuring instrument management system of FIG. 6.

Referring to FIG. 5, another embodiment of the disclosure provides a measuring instrument including the local quantity value transfer/traceability component 2, the remote communication component 4 and the central processing component 1. The local quantity value transfer/traceability component 2 and the remote communication component 4 are connected to the central processing component 1. The local quantity value transfer/traceability component 2 is the meter category component. The measuring instrument can be a thermometer, voltmeter, ammeter, high performance liquid chromatograph, photoelectric detector, etc. The meter category component means that the component has the characteristics of a standard meter, and it has an input component that detects the input quantity provided by the source category component of this or other measuring instruments. The source category component can be a caliper, sensor, pressure gauge, voltage detection circuit, etc.

The local quantity value transfer/traceability component 2 can include an input component. The input component belongs to the standard meter category measuring instrument or a part thereof, from the single-function measuring meter (such as the indicator meter, the pointer pressure gauge, the general caliper, etc.) to the measuring receiver with measuring range, bandwidth, modulation format and amplitude, etc. Different measuring instruments have different degrees of simplicity or complexity. The input component or the standard meter category measuring instruments generally include an input conversion/demodulation and matching module, a test module (including various test sensors), a sample/hold module, an analog-to-digital conversion module, and so on. single-function test meters are special cases of the standard meters or the input component. The local quantity value transfer/traceability component 2 is an input component that can be directly connected to the output port of an external device or other measuring instrument and directly test the corresponding value of the input port connected to the output port of the external equipment or other measuring instruments.

The measuring instrument can also include a human-machine dialogue component 5, which allows the measuring instruments to operate according to the person's intent through human-machine dialogue.

The central processing component 1 can include a central processing component such as a CPU or MPU or a host system built with a CPU or MPU as the core, including hardware or software.

The remote communication component 4 has various types and structures, for example, it can be Wi-Fi module, 3G module, 4G module, 5G module, etc., which uses the resources of the link network 12 to form a network and provide remote communication or remote-control functions.

The measuring instrument can obtain a remote high-grade metrological standard from external by the remote communication component 4, perform quantity value transfer/traceability to the local quantity value transfer/traceability component 2 by using the remote high-grade metrological standard. The metrological grade of the remote high-grade metrological standard is greater than that of the local quantity value transfer/traceability component 2. That is, the metrological stability of the remote high-grade metrological standard is better than or equal to that of the local quantity value transfer/traceability component 2. Specifically, the central processing component 1 is connected to the remote high-grade standard signal source through the remote communication component 4 and the link network 12 to receive and measure the standard signal broadcast from the remote high-grade standard signal source, and the central processing component 1 controls the local quantity value transfer/traceability component 2 to perform metrological operation to the standard signal, thereby performing quantity value transfer/traceability to the local quantity value transfer/traceability component 2. In a further embodiment, the central processing component 1 also sends the metrological results of the local quantity value transfer/traceability component 2 for the remote high-grade metrological standard to an external device through the remote communication component 4, such as a server installed with a measuring instrument management system, and the external device can analyze the metrological results to obtain the quantity value transfer/traceability results of the local quantity value transfer/traceability component 2, or generate a verification certificate or report of the measuring instrument.

In some embodiments, the measuring instrument obtains a remote high-grade metrological standard through the remote communication component 4, which can be a download of the remote high-grade metrological standard that has been converted into the relevant software program module through the remote communication component 4. In other embodiments, for some parametric quantities that cannot be directly propagated through the remote communication, such as length, weight, etc., these can first be converted to parametric quantities that can be propagated remotely, such as to time-frequency signals propagated through radio, and then the remote communication component 4 receives the remote high-grade standard that has been converted to a time-frequency signal. The local quantity value transfer/traceability component 2 should match the form exhibited by the remote high-grade metrological standard and be able to perform quantity value transfer/traceability according to that remote high-grade standard.

In a further embodiment, the measuring instrument further includes a first external connection interface 7, the first external connection interface 7 is connected to the local quantity value transfer/traceability component 2, the first external connection interface 7 is configured to connect the external metrological device 200. The central processing component 1 is further configured to make an external metrological device 200 connected to the first external connection interface 7 perform metrological operation to the remote high-grade metrological standard, receive a metrological result from the external metrological device 200 connected to the external connection interface, and send the metrological result to an external device through the remote communication component 4, the external device analyzes the metrological result of the external metrological device 200 to obtain the quantity value transfer/traceability result of the external metrological device 200. The external device may send the quantity value transfer/traceability results of the external metrological device 200 in turn to the measuring instrument through the remote communication component 4, which in turn transmits the quantity value transfer/traceability results of the external metrological device 200 to the external metrological device 200 through the first external connection interface 7. The first external connection interface 7 matches the local quantity value transfer/traceability component 2 and may be a signal input and/or output interface, for example, it may be a USB interface, a network connection interface, a video/audio signal output plug, a standard source mounting platform, etc.

In a further embodiment, the measuring instrument also includes a positioning component (not shown in figure) and/or a local communication component 8 and/or an internal storage component 9 and/or a self-examination/calibration component 11 (also referred as self-examination and calibration component), i.e., that is the measuring instruments include one or more of the positioning component, the local communication component 8, the internal storage component 9 and the self-examination/calibration component 11. The positioning component, the local communication component 8, the internal storage component 9 and the self-examination/calibration component 11 are all connected to the central processing component 1, the central processing component 1 controls the positioning component, the local communication component 8, the internal storage component 9 and the self-examination/calibration component 11 through the internal protocols.

The positioning component is used to position the measuring instruments and transmit the positioning signal through the remote communication component 4 and the link network 12. In some embodiments, the positioning component and the remote communication component 4 can be integrated into the same chip.

The internal storage component 9 can be RAM, ROM, EPROM, EEPROM, FLASH, disk, CD-ROM and other storage devices. The internal storage component 9 can store the parameters and algorithms, etc. that need to be modified and corrected after the examination, self-examination, self-calibration, verification, calibration, etc., so that it is convenient for the subsequent program to be called at any time, and it can also store the metrological data generated by the local quantity value transfer/traceability component 2 during normal operation and the data performed quantity value transfer/traceability to the external metrological device 200 by the local quantity value transfer/traceability component 2, etc., it can also store the metrological result of the local quantity value transfer/traceability component 2 to the remote high-grade metrological standard or the quantity value transfer/traceability data of the measuring instrument, etc. These quantity value transfer/traceability data may can include quantity value transfer or traceability data/results during a valid verification cycle or calibration interval, local or remote categories, quantity value transfer or traceability categories/times, quantity value transfer or traceability unit names and locations, high-grade standard source or instrument identification, etc. These data are generally retained for 5 years or more.

The local communication component 8 is used for local proximity communication of the measuring instrument, the main difference with the remote communication component 4 is that it can transmit signals with another local external metrological device 200 without the link network 12. The local communication component 8 can be the external communication interface and protocol components for external communication between the measuring instrument and the calibrated (verdict) external metrological instrument 200 through the link bus, or it can be the components for communication using IR (infrared) or short-range wireless communication technology.

The self-examination and calibration component 11 are used for real-time correction/monitoring of the operation of the measuring instrument to ensure the normal operation of the measuring instrument and the accuracy and reliability of the displayed value.

In a further embodiment, the measuring instrument also includes an environmental parameter detection module 10. The environmental parameter detection module 10 is connected to the central processing component 1, and the central processing component 1 is used to adjust the output of the local quantity value transfer/traceability component 2 according to the detection results of the environmental parameter detection component 10, such as temperature compensation, etc. The environmental parameter detection component 10 samples parameters or factors whose values are influenced by environmental conditions, and the sampled data is either processed by itself or handed over to the central processing component 1 for processing, in order to eliminate the influence of environmental factors on the displayed values of the measuring instruments. Different types of the measuring instruments are configured with different types of the environmental parameter detection components 10, such as the length measuring instruments are greatly affected by temperature, so configured of the temperature sampler or sensor; the scale measuring instruments are greatly affected by environmental vibration, so configured of the vibration sampler or sensor; the electromagnetic measuring instruments are greatly affected by environmental electromagnetic interference, so configured of the environmental electromagnetic interference sampler or sensor; the halogen leak detector must eliminate the impact of environmental noise, so the instrument needs to be configured in addition to the detection of halogen gas leakage sampler or sensor, but also needs to be configured to detect the environment has been left behind in the halogen gas sampler or sensor.

An embodiment of the disclosure further provides a method of remote quantity value transfer/traceability of a measuring instrument, the measuring instrument is a meter category component. The method of remote quantity value transfer/traceability of the measuring instrument includes:

obtaining a remote high-grade metrological standard through remote communication by the measuring instrument, a metrological grade of the remote high-grade metrological standard is greater than that of the measuring instrument;

performing metrological operation to the remote high-grade metrological standard to thereby obtain a metrological result by the measuring instrument; and sending the metrological result of the measuring instrument to an external device through remote communication.

In a further embodiment, the method of remote quantity value transfer/traceability of the measuring instrument further includes: obtaining a quantity value transfer/traceability result according to the metrological result of the measuring instrument and generating a verification certificate or report of the measuring instrument, by the external device.

How the above method is specifically performed can be referred to the relevant description in the above embodiment of the measuring instruments, and will not be repeated here.

The measuring instrument and the method of remote quantity value transfer/traceability provided by the embodiment of the disclosure, which obtains the remote high-grade metrological standard through remote communication and uses the remote high-grade metrological standard to perform quantity value transfer/traceability to the local quantity value transfer/traceability component, makes the quantity value transfer/traceability of the measuring instrument very convenient and simple.

Referring to FIG. 6 to FIG. 9, an embodiment of the disclosure also provides a measuring instrument management system 800, including:
- a connection module 81, configured to perform network connection to the measuring instrument 100;
- a quantity value transfer/traceability control module 82, configured to remotely control the quantity value transfer/traceability of the measuring instrument 100;
- a storage module 83, configured to record the quantity value transfer/traceability results of the measuring instrument 100.

The measuring instrument management system 800 may be a software system installed on a computer, for example, it may be installed within a computer of a metrology technical organization. Of course, in some embodiments, the measuring instrument management system 800 may also include a subsystem for installation in the computer of the measuring instrument development/production/sales/use department for guiding and managing the development/production/sales/use of the measuring instrument by the enterprise, and a subsystem for installation in the government metrology administration department for supervising and managing the measuring instrument within the jurisdiction. The connection module 81 can be a module within the software system for accessing the measuring instrument 100 within that measuring instrument management system 800, and for example, may be a module for entering information (including IP address, etc.) of the measuring instrument 100 into the measuring instrument management system 800 to enable the measuring instrument management system 800 to connect to that measuring instrument 100. The storage module 83 may be embodied at the software level as a database for recording the quantity value transfer/traceability results, etc., and at the hardware level as a storage device for a computer, such as a hard disk or a cloud server, etc.

The quantity value transfer/traceability control module 82 is used to remotely control the measuring instrument 100 for quantity value transfer/traceability. In some embodiments, the measuring instrument management system 800 controls the measuring instrument 100 to perform the quantity value transfer/traceability operation automatically, such as send control commands to the measuring instrument 100 and thereby to make the measuring instrument 100 run its own quantity value transfer/traceability program to perform the quantity value transfer/traceability and send the quantity value transfer/traceability results back to the measuring instrument management system 800; or the measuring instrument 100 itself does not have its own quantity value transfer/traceability program, and the measuring instrument management system 800 has a quantity value transfer/traceability program matching the measuring instrument 100, and the measuring instrument management system 800 starts the quantity value transfer/traceability program, performs the quantity value transfer/traceability to the measuring instrument 100, and records the quantity value transfer/traceability results of the measuring instrument 100. In other embodiments, the measuring instrument 100 cannot perform the quantity value transfer/traceability operation fully automatically, but depends on the operator of the measuring instrument 100 to assist in the operation, in which case, the measuring instrument management system 800 can automatically send the operation prompts for the quantity value transfer/traceability to the measuring instrument 100, and the operator operates according to the operation prompts, and the measuring instrument management system 800 obtains the results of each operation of the measuring instrument 100 (such as whether the operation of the current step has been completed), and further sends the operation prompt of the quantity value transfer/traceability to the measuring instrument 100 according to the operation result of the measuring instrument 100, so that the quantity value transfer/traceability operation is performed step by step with the assistance of the operator until the quantity value transfer/traceability operation is completed, and records the quantity value transfer/traceability result of the measuring instrument 100.

It is noted that the network connection referred to herein may be a wireless network connection or a wired network connection, specifically, the measuring instrument management system 800 may be networked to the measuring instrument 100 through the link network 12. The remote control referred to herein refers to controlling the measuring instrument 100 through the network, without limiting the physical geographic proximity of the measuring instrument management system 800 and the measuring instrument 100.

In a further embodiment, the measuring instrument management system 800 also includes a certificate/report generation module 84, configured for generating a verification certificate or report of the measuring instrument 100 according to the quantity value transfer/traceability results of the measuring instrument 100. When the measured (also referred as calibrated or verified) measuring instrument 100 has undergone quantity value transfer or traceability, the measuring instrument management system 800 analyzes and processes the data obtained from the quantity value transfer/traceability, and generates the current quantity value transfer or traceability results online according to the error limits or qualification criteria of the corresponding measuring instrument 100, the current error calculation results, etc.: if the quantity value transfer or traceability results are qualified or meet the technical requirements, the certificate/report template of the relevant measuring instrument 100 can be called immediately to generate the certificate/report of the measured (calibrated) measuring instrument 100; if quantity value transfer or traceability results is unqualified or does not meet the technical requirements, a result notice will be issued, and the abnormal event pre-(report) alarm procedure will be started immediately, such as downgrading, restricting the use or scrapping.

In a further embodiment, the quantity value transfer/traceability control module 82 initiates a quantity value transfer/traceability program matching the measuring instrument 100 according to the characteristics of the measuring instrument 100 to perform the quantity value transfer/traceability of the measuring instrument 100. Since this measuring instrument management system 800 can manage many different types of the measuring instrument 100, and different types of the measuring instrument 100 have different quantity value transfer/traceability methods. Therefore, the quantity value transfer/traceability control module 82 can obtain some characteristics of the measuring instrument 100, such as parameters, for example the name of the measuring instrument, specifications and models, technical parameters, manufacturer and number, and even the environmental conditions in which the measuring instrument 100, the age of use, etc., and then select a quantity value transfer/traceability program matching these characteristics, execute the quantity value transfer/traceability program, and perform quantity value transfer/traceability on the measuring instrument 100.

In a further embodiment, the quantity value transfer/traceability control module 82 adjusts the frequency of the quantity value transfer/traceability of the measuring instrument 100 according to the stability of the metrological results and/or the magnitude of the error of the measuring instrument 100. Instead of setting a fixed calibration period or calibration interval, the metrological data of the measuring instrument 100 managed by the measuring instrument management system 800 can be monitored by the measuring instrument management system 800 at all times and analyzed by an expert system 85 based on artificial intelligence or artificial neural network features such as big data, deep learning, genetic/genetic algorithms, soft computing, etc. For the measuring instrument 100 that has no problems and the long-term operation results show that its displayed value is stable and the prediction will not exceed or the probability of exceeding is small, the quantity value transfer/traceability can be postponed. When the operation results show that the displayed value is not very stable and the predicted result may exceed the difference or the probability of exceeding the difference is large, the frequency of the quantity value transfer/traceability is increased; when some measuring instruments 100 cannot guarantee the stability of mass quantity value transfer/traceability even if the frequency is increased, the measuring instrument management system 800 will prompt timely scrapping or replacement and give a warning of immediate replacement; during the process of quantity value transfer/traceability including self-verification, self-calibration, prediction, evaluation, test, standardize, calibration, verification, etc., the measuring instrument 100 is found to be damaged or the indicated value of the measuring instrument 100 is out of tolerance, the measuring instrument 100 will be promptly prompted and warned of requiring timely replacement by the measuring instrument management system 800 in a timely manner. This makes the measuring instrument management system 800 not only from the technical means to ensure that it saves a large number of quantity value transfer or traceability of time, human and material resources of the measuring instrument 100, but also to ensure that the measuring instrument 100 in use (online) are qualified or meet the requirements, without the risk of "running with disease".

In a further embodiment, the measuring instrument management system 800 further includes an encoder 86; the encoder 86 is used to generate a dynamic code for the measuring instrument 100, the dynamic code including at least the following coding fields: the current geographic location of the measuring instrument, the quantity value transfer/traceability information of the measuring instrument; and/or, the encoder 86 is used to automatically generate a permanent code for the measuring instrument 100. In actual operation, the measuring instrument 100 can have a permanent code and a dynamic code, the permanent code will not change throughout the life cycle of the measuring instrument 100, and the dynamic code can be dynamically changed with the use and location change of the measuring instrument 100, and by setting certain rules, the permanent code and dynamic code of each measuring instrument 100 can be unique, that is, there will be no coding conflicts with other measuring instruments 100. The permanent code can be identified in the internal memory chip of the measuring instrument, on the outer shell (outer packaging, outer surface) of the measuring instrument and other appropriate locations or in the documentation or files accompanying the measuring instrument before the measuring instrument 100 leaves the factory, or can be generated by the measuring instrument management system 800 for the measuring instrument 100 when the measuring instrument 100 is first connected to the measuring instrument management system 800. In this embodiment, the dynamic code includes at least the following coding fields: the current geographic location of the measuring instrument, the quantity value transfer/traceability information of the measuring instrument, i.e., the dynamic code contains the current geographic location of the measuring instrument, the quantity value transfer/traceability information of the measuring instrument, etc. When the current geographic location of the measuring instrument 100 changes, or when the measuring instrument 100 has performed quantity value transfer/traceability, the dynamic code also changes accordingly. The quantity value transfer/traceability information of the measuring instrument can be the time information of the latest quantity value transfer/traceability, etc. The initial code of the dynamic code can be identified in the internal memory chip of the measuring instrument, on the outer shell (outer packaging, outer surface) of the measuring instrument and other appropriate locations or in the documentation or files accompanying the measuring instrument before the measuring instrument 100 leaves the factory, or can be generated by the measuring instrument management system 800 for the measuring instrument 100 when the measuring instrument 100 is first connected to the measuring instrument management system 800. In other embodiments, the dynamic code may further include fields such as the name of the developer/producer, the geographic location of the developer/producer, the naming code for the specialized field of the measuring instrument, and the date or moment of production of the measuring instrument. The dynamic code may be recorded in the internal memory chip of the measuring instrument 100.

In a further embodiment, the measuring instrument management system 800 also includes a measuring instrument tracking module 87, and the measuring instrument tracking module 87 is used to record the geographic location information of the measuring instrument 100. In some embodiments, the measuring instrument 100 comes with a positioning device (e.g., GNSS positioning circuit and positioning protocol, GPS positioning component, etc.), and the measuring instrument management system 800 can obtain the geographic location information of the measuring instrument 100. In other embodiments, the measuring instrument 100 can be manually entered into the measuring instrument management system 800, or the measuring instrument management system 800 obtains the geographic location information of the measuring instrument 100 by obtaining the dynamic code or the network IP address of the measuring instrument 100, etc. By recording the geographic location information of the measuring instrument 100, the measuring instrument management system 800 can obtain real-time tracking and positioning of the measuring instrument 100, can assist in the analysis of the current status and maintenance of the measuring instrument, can output the coverage area distribution and the rend analysist of the measuring instrument, etc.

In some further embodiments, the measuring instrument 100 includes an in-machine high-grade metrological standard and a local quantity value transfer/traceability component 2. The measuring instrument management system 800 controls the measuring instrument 100 to perform quantity value transfer/traceability of the local quantity value transfer/traceability component 2 by using the in-machine high-grade metrological standard. In other further embodiments, the measuring instrument 100 includes a remote communication component 4 and a local quantity value transfer/traceability component 2, and the measuring instrument management system 800 controls the measuring instrument 100 to obtain a remote high-grade metrological standard from outside of the measuring instrument 100 through the remote communication component 4 and perform quantity value transfer/traceability to the local quantity value transfer/traceability component 2 by using the remote high-grade metrological standard. The method of quantity value transfer/traceability of the local quantity value transfer/traceability component 2 through the in-machine high-grade metrological standard or the remote high-grade metrological standard has been described in the above-mentioned embodiments of the measuring instrument and will not be repeated here.

In a further embodiment, the measuring instrument management system 800 also includes an expert system 85. The expert system 85 is an artificial intelligence computer program or a group of artificial intelligence computer programs that can apply a large amount of expert knowledge and reasoning methods to solve complex problems in certain specific fields. It belongs to a development branch of artificial intelligence. The research goal of the expert systems 85 is to simulate the reasoning thought process of the human experts. Generally, the knowledge and experience of domain experts are stored in the computer with a knowledge expression mode, and the system makes inferences on the input facts and makes judgments and decisions.

The expert systems 85 consists of the following components: a human-machine interface, a knowledge acquisition mechanism, an inference engine, an interpreter, a knowledge base and management system thereof, a database and management system thereof, etc. Most of the basic structures are the knowledge base, the database and the inference engine. The details are as follows.

The human-machine interface: is the interface for the expert system to communicate with the user, which is connected with the knowledge acquisition mechanism, the inference engine and the interpreter, and generally consists of keyboard, display and other input/output devices. Through the human-machine interface, the user inputs corresponding knowledge, necessary data, parameters and other information to the system and answers relevant questions raised by the system, and the system outputs reasoning results and relevant explanations, etc. to the user.

The knowledge acquisition mechanism: connected with the human-machine interface and the knowledge base, it is the key to the superiority of the knowledge base of the expert system. Through knowledge acquisition, the contents in the knowledge base can be expanded and modified, and the automatic learning function can also be realized. The knowledge acquisition is responsible for establishing, modifying and expanding the knowledge base, and is an important institution in expert systems for converting various expertise for problem solving from the minds of human experts or other knowledge sources into the knowledge base. Knowledge acquisition can be used from manual knowledge acquisition methods, or semi-automatic knowledge acquisition methods or automatic knowledge acquisition methods.

The inference engine: connected to the human-machine interface, the knowledge base, and the database, it is the core actuator for implementing problem solving. It interprets and executes the relevant knowledge in the knowledge base and records the results in the appropriate space of the dynamic base. There can be two types of reasoning: a forward reasoning and a reverse reasoning. The forward reasoning matches from conditions (antecedent) to conclusions (consequent), while the reverse reasoning first assumes that a conclusion holds to see if its conditions whether are satisfied. The inference engine and the knowledge base are both separate and complementary: the program of the inference engine is independent of the specific knowledge content of the knowledge base, so that modifications to the knowledge base do not require changes to the program of the inference engine, but the solution programs for different knowledge types are prepared according to the characteristics of different knowledge types and corroborate each other.

The interpreter: connected to the human-machine interface and the database, is used to explain the solution process and to answer questions from the user. The two most basic questions are "Why" and "How". The interpreter allows the user to understand what the program is doing and why it is doing it. In order to answer the "why" query to reach a certain conclusion, the system usually needs to backtrack the reasoning path stored in the dynamic library and translate it into a natural language expression that the user can accept. The interpreter is able to explain the conclusion and solution process based on the user's questions.

The knowledge base: is used to store the collection of domain knowledge required to solve the problem provided by the expert and is the core component of the expert system. The problem-solving process of the expert system simulates the expert's way of thinking through the knowledge in the knowledge base, so the quality and quantity of the knowledge in the knowledge base determines the quality level of the expert system. The representation of knowledge can be in various forms, including frames, rules, semantic networks, and so on. Generally speaking, the knowledge base in the expert system and the expert system program are independent of each other, and the user can improve the performance of the expert system by changing and improving the knowledge content in the knowledge base. The construction of the knowledge base requires knowledge engineers and domain experts to cooperate with each other to organize the knowledge in the minds of domain experts and store it in the knowledge base with the systematic knowledge method. When solving a problem, the user provides some known data to the system and can obtain expert-level conclusions from the system.

The knowledge of the expert system 85 includes three main categories: the general knowledge, the metrological basic knowledge in the metrological field, and expertise in specific measuring instruments.

The general knowledge includes the language translator, ancient and modern customs, common sense, common thinking habits and stereotypes, laws and regulations, ethics and morality, deep learning of artificial intelligence, pattern recognition and modeling, logical reasoning and proof, independent thinking and deciding, automatic planning and design, genetic (or genetic) programming algorithms, neural networks, soft computing, complex systems and other knowledge. The system knowledge with initial entry is at least the knowledge learned by regular people who have graduated from the university science graduate, and the evaluation criteria of the knowledge learned by the university science graduate will change with the adjustment of the corresponding syllabus, and then the system will learn deeply according to the genetic programming algorithm until it improves to the level of super expert.

The metrological basic knowledge in the metrological field refers to the knowledge that the practitioners of the metrological system should know, including domestic and foreign metrological laws and regulations, verification systems and verification system meters, quantity value transfer/traceability algorithms and quantity value transfer/traceability block diagrams, mathematical statistics methods, and changes trend in quantity values analysis and forecasting methods, uncertainty evaluation methods, adaptive methods and other analysis methods, as well as the application and integration of artificial intelligence methods in the metrological field, qualification criteria or error limits or evaluation methods, corresponding comparison methods, compilation of papers in newspapers and journals, and other relevant information. The system knowledge is initially entered with the professional skills of at least an associate senior engineer or above, and the criteria for judging the professional skills of this associate senior engineer will be updated with the update of the social skills level, and then the system will be allowed to learn deeply until it is improved to the level of a super expert according to the genetic programming algorithm.

The expertise in specific measuring instruments refers to the specific subdivision of expertise related to a specific measuring instrument, including the basic principles related to the measuring instrument, domestic and foreign metrological calibration regulations or calibration specifications issued in previous years and their dissemination materials and timely update to the latest valid version (the old version is retained for reference, the new version as the basis for operation), according to the common calibration system meter to form a specific measuring instrument calibration system meter, forming a specific measuring instrument quantity value transfer/traceability block diagram according to the common quantity value transfer/traceability algorithm, specific uncertainty assessment reports, specific conformity criteria or error limits or comparative evaluation methods, other relevant information such as compilation of newspaper and magazine papers related to specific measurement apparatus, original record format or template, certificate report format or template, data or parameter (automatic) correction/change/prediction/diagnosis/Setting/design/planning and other operational guidelines, etc. The system knowledge with initial entry is at least the professional skills of associate senior engineer or above, and the criteria for judging the professional skills of the associate senior engineer will be updated with the update of the social skills level, and then the system will learn deeply until it improves to the level of super expert according to the genetic programming algorithm.

Although there are generative, framework, and semantic network forms of knowledge representation in artificial intelligence, the more common knowledge used in expert systems 85 is generative rules. Generative rules appear in the form of IF . . . THEN . . . , just like conditional statements in programming languages such as BASIC, where IF is followed by a condition (antecedent) and THEN is followed by a conclusion (consequent), and both the condition and the conclusion can be compounded by logical operations AND, OR, and NOT. If the preconditions are satisfied, the corresponding action or conclusion is generated.

The database: dedicated to store all the information generated during the operation of the system and the raw data needed, including user input, records of the reasoning process and intermediate results and final conclusions, etc. Database, also called dynamic library or working memory, is a collection reflecting the current state of problem solving. The state consisting of various facts, propositions and relations in the database is both the basis for the inference engine to select knowledge and the source for the interpreter to obtain the reasoning path. For example, the technical parameters, environmental conditions, original records, certificates or reports of a specific measuring instrument quantity value transfer or traceability required (high grade) standard and the object to be inspected (school).

The final work to be accomplished by this expert system 85 includes planning, design, monitoring, diagnosis, interpretation, quantity value transfer or traceability, prediction, decision making, teaching, etc. for the whole process of quantity transfer or traceability of the measuring instruments 100.

An embodiment of the disclosure also provides a method of quantity value transfer or traceability of a measuring instrument, which includes:

connecting the measuring instrument management system 800 to the measuring instrument 100 in a network;

remotely controlling the measuring instrument 100 for performing quantity value transfer/traceability through the measuring instrument management system 800; and recording the quantity value transfer/traceability results of the measuring instrument 100 in the measuring instrument management system 800.

In a further embodiment, the method of quantity value transfer/traceability method of the measuring instrument further includes: generating a verification certificate or report of the measuring instrument 100 according to the quantity value transfer/traceability results of the measuring instrument 100.

In a further embodiment, the measuring instrument 100 includes an in-machine high-grade metrological standard and a local quantity value transfer/traceability component 2. The measuring instrument management system 800 controls the measuring instrument 100 perform quantity value transfer/traceability of the local quantity value transfer/traceability component 2 by using the in-machine high-grade metrological standard. In other further embodiments, the measuring instrument 100 includes a remote communication component 4 and a local quantity value transfer/traceability component 2, and the measuring instrument management system 800 controls the measuring instrument 100 to obtain a remote high-grade metrological standard from outside of the measuring instrument 100 through the remote communication component 4 and to perform quantity value transfer/traceability to the local quantity value transfer/traceability component 2 by using the remote high-grade metrological standard.

In a further embodiment, the quantity value transfer/traceability control module 82 initiates a quantity value transfer/traceability program matching the measuring instrument 100 according to the characteristics of the measuring instrument 100 to perform quantity value transfer/traceability to the measuring instrument 100.

In a further embodiment, the measuring instrument management system 800 adjusts the frequency of the quantity value transfer/traceability of the measuring instrument 100 according to the stability of the metrological results and/or the magnitude of the error of the measuring instrument 100.

In a further embodiment, the measuring instrument management system 800 controls the metrology apparatus 100 to automatically perform the quantity value transfer/traceability operation; or the measuring instrument management system 800 automatically sends operation prompts of the quantity value transfer/traceability to the measuring instrument 100 and further sends operation prompts of the quantity value transfer/traceability to the measuring instrument 100 according to the operation results of the measuring instrument 100 until the quantity value transfer/traceability operation is completed.

The specific implementation of the above method can be referred to the description in the above embodiment of the measuring instrument management system 800 and will not be repeated here.

In some further embodiments, the measuring instrument management system 800 automatically controls the measuring instrument 100 to perform quantity value transfer/traceability when the interval of the quantity value transfer/traceability period of the measuring instrument 100 reaches a preset period. Specifically, each measuring instrument 100 may set its quantity value transfer/traceability period, and the measuring instrument management system 800 automatically controls the measuring instrument 100 to perform quantity value transfer/traceability when the length of time between the use of the measuring instrument 100 and the factory time or the last quantity value transfer/traceability time reaches a preset period (e.g., half a year or one year). The way to perform the quantity value transfer/traceability can be to make the measuring instrument 100 automatically run the quantity value transfer/traceability program, or the measuring instrument management system 800 automatically sends the operation prompts of the quantity value transfer/traceability to the measuring instrument 100, and the operator operates according to the operation prompts, and the measuring instrument management system 800 obtains the result of each operation step of the measuring instrument 100 (e.g., whether the operation of the current step has been completed) and further sends operation prompts of the quantity value transfer/traceability to the measuring instrument 100 according to the operation results of the measuring instrument 100, so that the quantity value transfer/tracing operation is performed step by step with the assistance of the operator until the quantity value transfer/traceability operation is completed, and the quantity value transfer/traceability results of the measuring instrument 100 are recorded.

In some other further embodiments, when the measurement parameters (for example, measurement error, number of measurements) of the measuring instrument 100 reach a preset value, the measuring instrument management system 800 automatically controls the measuring instrument 100 to perform quantity value transfer/traceability.

In a further embodiment, the measuring instrument 100 has a central processing component 1 and a storage component (e.g., internal storage component 9). The storage component stores a quantity value transfer/traceability program, and the measuring instrument management system 800 controls the central processing component 1 to run the quantity value transfer/traceability program to perform quantity value transfer/traceability to the local quantity value transfer/traceability component 2. The way of quantity value transfer/traceability has been described in detail in the above-mentioned embodiments and will not be repeated here.

Figure 9:
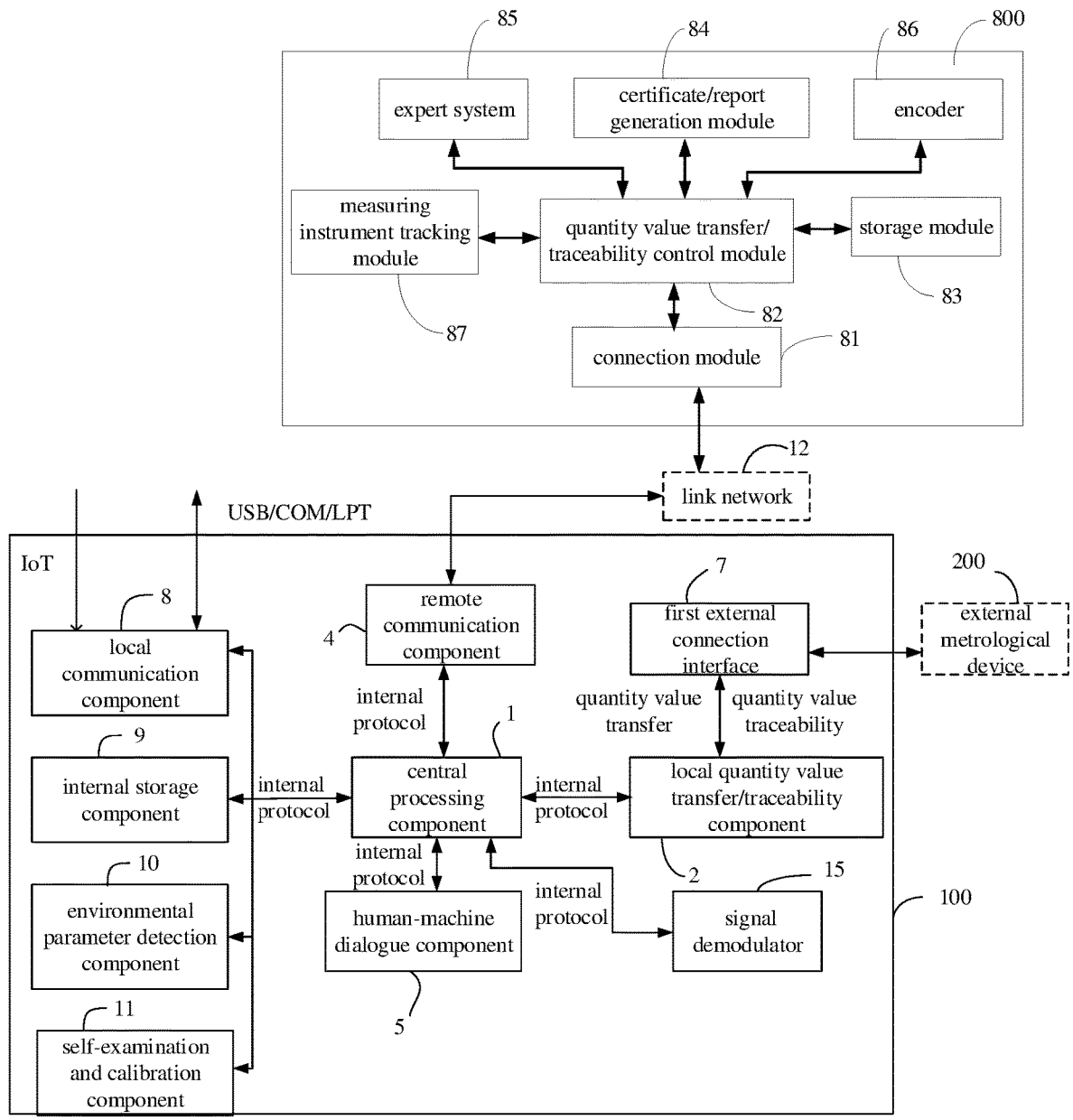
FIG. 9 is a schematic view of a connection between the measuring instrument management system and the measuring instrument according to another embodiment of the disclosure.

Referring to FIG. 9, in another embodiment of the disclosure, the measuring instrument 100 further includes a signal demodulator 15, and the measuring instrument management system 800 correspondingly includes a standard signal generator 89 and a signal modulator 88. When the quantity value transfer/traceability of the measuring instrument 100 is started, the quantity value transfer/traceability control module 82 controls the standard signal generator 89 to generate a remote high-grade metrological standard signal corresponding to the measuring instrument 100 according to the type and model of the measuring instrument 100, which may be a digital signal or an analog signal. The signal modulator 88 modulates the remote high-grade metrological standard signal to improve the anti-interference capability of the signal. The modulation can be in the form of amplitude modulation, frequency modulation and phase modulation, which are not further described here. The modulated signal is sent out by means of radio waves or a wired network. The measuring instrument 100 can obtain the modulated remote high-grade metrological standard signal from the measuring instrument management system 800 through the remote communication component 4, which can be the digital signal or the analog signal, and then demodulate the remote high-grade metrological standard signal through the signal demodulator 15. The local quantity value transfer/traceability module 2 detects the demodulated remote high-grade metrological standard, and then sends the detection result to the measuring instrument management system 800 through the remote communication component 4. The measuring instrument management system 800 can analyze and calculate the indicated value error of the local quantity transfer/traceable component 2 according to the remote high-grade metrological standard and the detection results of the local quantity value transfer/traceability component 2 for the remote high-grade metrological standard, that is, obtain the quantity value transfer/traceability result of the measuring instrument 100. In some embodiments, the measuring instrument management system 800 further includes a first proportional circuit (not shown in figure), configured to scale up or down the remote high-grade metrological standard signal generated by the standard signal generator 89, for example, to scale down a 100 V voltage standard signal to 10V in a 10:1 ratio, and accordingly, a second proportional circuit corresponding to the first proportional circuit is provided in the measuring instrument 100 to scale down or scale up the remote high-grade metrological standard signal received by the remote communication component 4.

For some non-electric quantity measuring instruments (such as pressure gauges, electronic thermometers, etc.), the local quantity transmission/traceability components 2 generally include a sensor (such as pressure sensors, temperature sensors, etc.) and a measurer connected to the sensor, the sensor is configured to detect an object to be detected and generate an electrical signal, the measurer is configured to perform metrological operation to the electrical signal of the sensor thereby obtain a metrological result of the object to be detected. When the measuring instrument 100 is in a normal working state (first state), the central processing component 1 controls the measurer to perform metrological operation to the electrical signal of the sensor, and the metrological result obtained at this time is the metrological result of the measuring instrument on the object to be detected. In the remote quantity value transfer/traceability state (second state), the central processing component 1 controls the measurer to perform metrological operation to the remote high-grade metrological standard received by the remote communication component 4 as a way to perform quantity value transfer/traceability of the local quantity value transfer/traceability component 2. Specifically, a toggle switch can be provided in the measuring instrument 100 to connect the measurer to one of the sensor and the remote communication component 4. For this approach, since the quantity value transfer/traceability bypasses the sensor, the metrological error of the sensor is not easily obtained, but the metrological error of the measurer can still be obtained, which is also a way of quantity value transfer/traceability.

In a further embodiment, the measuring instrument 100 is selected from the group consisting of a voltage measuring instrument, a current measuring instrument, a resistance measuring instrument, a capacitance measuring instrument, an inductance measuring instrument, a temperature measuring instrument, a humidity measuring instrument, a weight measuring instrument, a pressure measuring instrument and a liquid level measuring instrument; the remote high-grade metrological standard correspondingly is selected from the group consisting of a voltage measuring standard, a current measuring standard, a resistance measuring standard, a capacitance measuring standard, an inductance measuring standard, a temperature measuring standard, a humidity measuring standard, a weight measuring standard, a pressure measuring standard and a liquid level measuring standard. The measuring instrument management system 800 can transmit the signals of the remote high-grade metrological standards such as voltage measuring standard, current measuring standard, resistance measuring standard, capacitance measuring standard, inductance measuring standard, temperature measuring standard, humidity measuring standard, weight measuring standard, pressure measuring standard or liquid level measuring standard to the measuring instrument 100 by means of radio waves or wired networks, and the measuring instrument 100 will perform measurement to the signals of the remote high-grade metrological standards and send the detection results (also referred as measured result) to the measuring instrument management system 800. The measuring instrument management system 800 analyzes and calculates the detection results to obtain the results of quantity value transfer/traceability, so as to realize quantity value transfer/traceability.

For example, when a voltmeter with a remote communication component is used for performing quantity value transfer/traceability, the measuring instrument management system 800 can generate an electrical signal of a specific frequency, that is a remote high-grade voltage metrological standard. The electrical signal of the specific frequency is equivalent to a metrological standard of 100V voltage. Then the measuring instrument management system 800 modulates the electrical signal of the remote high-grade voltage metrological standard, and sends out the electrical signal of the remote high-grade voltage metrological standard after modulated through a wireless network or a wired network after modulation. The voltmeter receives the electrical signal of the remote high-grade voltage metrological standard through the remote communication component, demodulates the electrical signal, and then performs metrological operation to the electrical signal of the remote high-grade voltage metrological standard after demodulated to obtain a metrological result, and the voltmeter sends the metrological result back to the measuring instrument management system 800. The measuring instrument management system compares the generated remote high-grade voltage metrological standard with the metrological result sent back by the voltmeter to obtain the metrological error of the voltmeter and generates quantity value transfer/traceability result of the voltmeter. For the electronic thermometer, the measuring instrument management system 800 can generate a specific frequency electrical signal to be used as a remote high-grade temperature metrological standard for the electronic thermometer, and the electronic thermometer receives the electrical signal of the remote high-grade temperature metrological standard, bypasses the temperature sensor, performs metrological operation to the electrical signal of the remote high-grade temperature metrological standard directly, and sends the metrological result back to the measuring instrument management system 800 for performing quantity value transfer/traceability.

The measuring instrument management system provided by the embodiment of the disclosure can perform remote quantity value transfer/traceability of measuring instrument through the network, without requiring the technicians of the higher-grade measurement institution to visit the location of the measuring instrument for quantity value transfer/traceability or transporting the measuring instrument to the higher-grade measurement institution for quantity value transfer/traceability, thus making the quantity value transfer/traceability simpler and more convenient, and also saving a lot of human and material resources.

The technical features of the above embodiments can be combined arbitrarily. For the sake of simple description, not all possible combinations of the various technical features in the above embodiments are described. However, as long as there is no contradiction in the combination of these technical features, it should be regarded as the scope of the specification.

The above-mentioned embodiments only express the concrete implementations of the disclosure, and their descriptions are more specific and detailed, but it should not be understood as limiting the protection scope of the disclosure. It should be noted that for those skilled in the related art, several modifications and improvements can be made without deviating from the inventive concept of the disclosure, which belong to the protection scope of the disclosure. Therefore, the protection scope of the disclosure shall be subject to the appended claims.

What is claimed is:

1. A measuring instrument, comprising: a local quantity value transfer/traceability component, a remote quantity value transfer/traceability component, a remote communication component and a central processing component;
wherein the local quantity value transfer/traceability component, the remote quantity value transfer/traceability component and the remote communication component are connected with the central processing component;
wherein the remote quantity value transfer/traceability component is one of a meter category component and a source category component, and the local quantity value transfer/traceability component is the other one of the meter category component and the source category component;
wherein the remote quantity value transfer/traceability component is configured to provide one of an in-machine high-grade metrological standard and a remote high-grade metrological standard for the local quantity value transfer/traceability component and thereby to perform quantity value transfer/traceability to the local quantity value transfer/traceability component by using the one of the in-machine metrological standard and the remote high-grade metrological standard.

2. The measuring instrument according to claim 1, further comprising a quantity value transfer/traceability switching component;
wherein the quantity value transfer/traceability switching component is connected with the local quantity value transfer/traceability component, the remote quantity value transfer/traceability component and the central processing component, and configured to switch on connection between the local quantity value transfer/traceability component and the remote quantity value transfer/traceability component, or switch off connection between the local quantity value transfer/traceability component and the remote quantity value transfer/traceability component.

3. The measuring instrument according to claim 2, further comprising an external connection interface;
wherein the quantity value transfer/traceability switching component is further configured to make an external metrological device connected to the external connection interface connect with the local quantity value transfer/traceability component or the remote quantity value transfer/traceability component.

4. The measuring instrument according to claim 1, wherein the remote quantity value transfer/traceability component comprises an in-machine high-grade metrological standard component and a quantity value transfer/traceability standard switching component connected with the in-machine high-grade metrological standard component;
and the quantity value transfer/traceability standard switching component is configured to make the local quantity value transfer/traceability component perform quantity value transfer/traceability through the in-machine high-grade metrological standard component, or make the local quantity value transfer/traceability component perform quantity value transfer/traceability according to the remote high-grade metrological standard obtained from the remote communication component.

5. The measuring instrument according to claim 4, wherein the remote quantity value transfer/traceability component further comprises an installation component and a detection component;
wherein the in-machine high-grade metrological standard component is detachably connected with the installation component, and the detection component is configured to detect whether the in-machine high-grade metrological standard component is connected with the installation component to obtain a detection result, and send the detection result to the central processing component.

6. The measuring instrument according to claim 4, further comprising an external connection interface;
wherein the quantity value transfer/traceability standard switching component is further configured to make the external connection interface connect with the in-machine high-grade metrological standard component, and thereby to enable quantity value transfer/traceability between the in-machine high-grade metrological standard component and an external metrological device connected to the external connection interface; and
wherein the external metrological device is configured to perform the quantity value transfer/traceability to the in-machine high-grade metrological standard component when a metrological grade of the external metrological device is greater than that of the in-machine high-grade metrological standard component; or wherein the in-machine high-grade metrological standard component is configured to perform the quantity value transfer/traceability to the external metrological device when the metrological grade of the external metrological device is less than that of the in-machine high-grade metrological standard component.

7. The measuring instrument according to claim 1, wherein the remote quantity value transfer/traceability component comprises an in-machine high-grade metrological standard component, and the in-machine high-grade metrological standard component is configured to at least provide at least one of high-grade metrological standards of a "zero" value, a "full scale" value and a "median" value in a measurement range of the local quantity value transfer/traceability module.

8. The measuring instrument according to claim 1, further comprising an external connection interface, and having at least one of a local quantity value transfer/traceability mode, a remote quantity value transfer/traceability mode, and an intermediate quantity value transfer/traceability mode;
wherein the remote quantity value transfer/traceability component is disconnected from the local quantity value transfer/traceability component and the local quantity value transfer/traceability component is configured to perform quantity value transfer/traceability to external, when in the local quantity value transfer/traceability mode;
wherein the remote quantity value transfer/traceability component is connected to the local quantity value transfer/traceability component and is configured to perform quantity value transfer/traceability to the local quantity value transfer/traceability component, when in the remote quantity value transfer/traceability mode; and
wherein one of the remote quantity value transfer/traceability component and the local quantity value transfer/traceability component is configured to perform quantity value transfer/traceability to an external metrological device connected to the external connection interface, when in the intermediate quantity value transfer/traceability mode.

9. The measuring instrument according to claim 8, wherein
the local quantity value transfer/traceability component is configured to perform quantity value transfer/traceability to the external metrological device connected to the external connection interface when in the intermediate quantity value transfer/traceability mode that a category of the remote quantity value transfer/traceability component is the same as that of the external metrological device connected to the external connection interface; or the remote quantity value transfer/traceability component is configured to perform quantity value transfer/traceability to the external metrological device connected to the external connection interface when in the intermediate quantity value transfer/traceability mode that a category of the local quantity value transfer/traceability component is the same as that of the external metrological device connected to the external connection interface;
or, wherein the remote quantity value transfer/traceability component is configured to perform quantity value transfer/traceability to the external metrological device by using the in-machine high-grade metrological standard or the remote high-grade metrological standard when the remote quantity value transfer/traceability component performs quantity value transfer/traceability to the external metrological device connected to the external connection interface in the intermediate quantity value transfer/traceability mode.

10. The measuring instrument according to claim 1, wherein the remote quantity value transfer/traceability component comprises an in-machine high-grade metrological standard component and a quantity value transfer/traceability standard switching component connected with the in-machine high-grade metrological standard component, and the quantity value transfer/traceability standard switching component is configured to perform remote quantity value transfer/traceability to the in-machine high-grade metrological standard component according to the remote high-grade metrological standard obtained from the remote communication component.

11. A measuring instrument, comprising: a local quantity value transfer/traceability component, a remote communication component and a central processing component;
wherein the local quantity value transfer/traceability component and the remote communication component are connected with the central processing component, the local quantity value transfer/traceability component is a meter category component, the measuring instrument is configured to obtain a remote high-grade metrological standard from external through the remote communication component, and the central processing component is configured to control the local quantity value transfer/traceability component to perform metrological operation to the remote high-grade metrological standard.

12. The measuring instrument according to claim 11, wherein the central processing component is configured to send a metrological result of the local quantity value transfer/traceability component to an external device through the remote communication component.

13. The measuring instrument according to claim 11, wherein a signal of the remote high-grade metrological standard from external through the remote communication component obtained by the measuring instrument is a digital signal or an analog signal; the measuring instrument comprises a signal demodulator configured to demodulate the signal of the remote high-grade metrological standard through the remote communication component; and/or
wherein the local quantity value transfer/traceability component comprises a sensor and a measurer connected to the sensor, the sensor is configured to detect an object to be detected and generate an electrical signal, the measurer is configured to perform metrological operation to the electrical signal of the sensor thereby obtain a metrological result of the object to be detected, the central processing component is configured to make the measurer perform the metrological operation to the electrical signal of the sensor in a first state, and make the measurer perform metrological operation to the remote high-grade metrological standard in a second state; and/or
wherein the measuring instrument is selected from the group consisting of a voltage measuring instrument, a current measuring instrument, a resistance measuring instrument, a capacitance measuring instrument, an inductance measuring instrument, a temperature measuring instrument, a humidity measuring instrument, a weight measuring instrument, a pressure measuring instrument and a liquid level measuring instrument; the remote high-grade metrological standard correspondingly is selected from the group consisting of a voltage measuring standard, a current measuring standard, a resistance measuring standard, a capacitance measuring standard, an inductance measuring standard, a temperature measuring standard, a humidity measuring standard, a weight measuring standard, a pressure measuring standard and a liquid level measuring standard.

14. The measuring instrument according to claim 11, further comprising an external connection interface;
wherein the central processing component is further configured to make an external metrological device connected to the external connection interface perform metrological operation to the remote high-grade metrological standard, receive a metrological result from the external metrological device connected to the external connection interface, and send the metrological result to an external device through the remote communication component.

15. A method of remote quantity value transfer/traceability of a measuring instrument, wherein the measuring instrument is a meter category component and the method comprises:
obtaining a remote high-grade metrological standard through remote communication by the measuring instrument, wherein a metrological grade of the remote high-grade metrological standard is greater than that of the measuring instrument;
performing metrological operation to the remote high-grade metrological standard to thereby obtain a metrological result by the measuring instrument; and
sending the metrological result of the measuring instrument to an external device through remote communication.

16. The method of remote quantity value transfer/traceability of the measuring instrument according to claim 15, wherein the method further comprises:
obtaining a quantity value transfer/traceability result according to the metrological result of the measuring instrument and generating a verification certificate or report of the measuring instrument, by the external device.

17. The method of remote quantity value transfer/traceability of the measuring instrument according to claim 15, wherein the measuring instrument is selected from the group consisting of a voltage measuring instrument, a current measuring instrument, a resistance measuring instrument, a capacitance measuring instrument, an inductance measuring instrument, a temperature measuring instrument, a humidity measuring instrument, a weight measuring instrument, a pressure measuring instrument and a liquid level measuring instrument; the remote high-grade metrological standard correspondingly is selected from the group consisting of a voltage measuring standard, a current measuring standard, a resistance measuring standard, a capacitance measuring standard, an inductance measuring standard, a temperature measuring standard, a humidity measuring standard, a weight measuring standard, a pressure measuring standard and a liquid level measuring standard.

18. The method of remote quantity value transfer/traceability of the measuring instrument according to claim 15, wherein the measuring instrument comprises a sensor and a measurer connected to the sensor, the sensor is configured to detect an object to be detected and generate an electrical signal, the measurer is configured to perform metrological operation to the electrical signal of the sensor thereby obtain a metrological result of the object to be detected; and
wherein the measurer is configured to perform metrological operation to the electrical signal of the sensor in a first state, and perform metrological operation to the remote high-grade metrological standard in a second state.

19. The method of remote quantity value transfer/traceability of the measuring instrument according to claim 15, after obtaining the remote high-grade metrological standard through remote communication, further comprising:

performing signal demodulation to the remote high-grade metrological standard, wherein the measuring instrument performs the metrological operation to the remote high-grade metrological standard after the signal demodulation.

* * * * *